(12) United States Patent
Lee et al.

(10) Patent No.: US 12,470,315 B2
(45) Date of Patent: Nov. 11, 2025

(54) OUT-OF-BAND BASED INDEPENDENT LINK TRAINING OF IN-BAND LINKS BETWEEN HOST DEVICES AND OPTICAL MODULES

(71) Applicant: Marvell Asia Pte Ltd, Singapore (SG)

(72) Inventors: Whay Sing Lee, Milpitas, CA (US); Todd Rope, Thousand Oaks, CA (US)

(73) Assignee: Marvell Asia Pte Ltd, Singapore (SG)

( * ) Notice: Subject to any disclaimer, the term of this patent is extended or adjusted under 35 U.S.C. 154(b) by 161 days.

(21) Appl. No.: 18/239,819

(22) Filed: Aug. 30, 2023

(65) Prior Publication Data

US 2024/0080123 A1 Mar. 7, 2024

Related U.S. Application Data

(60) Provisional application No. 63/403,006, filed on Sep. 1, 2022.

(51) Int. Cl.
*H04J 14/02* (2006.01)
*H04B 10/40* (2013.01)

(52) U.S. Cl.
CPC .......... *H04J 14/0267* (2013.01); *H04B 10/40* (2013.01)

(58) Field of Classification Search
CPC ............... H04J 14/0267; H04J 14/0293; H04J 14/0294; H04J 14/0295; H04B 10/40; H04B 10/03; H04B 10/07; H04B 10/073; H04B 10/075; H04B 10/0731; H04B 10/077; H04B 10/0773; H04B 10/0775; H04B 10/0777; H04B 10/0779
See application file for complete search history.

(56) References Cited

U.S. PATENT DOCUMENTS

2004/0126107 A1 7/2004 Jay et al.
2010/0124418 A1 5/2010 Noble et al.
(Continued)

FOREIGN PATENT DOCUMENTS

KR 20200012945 A 2/2020

OTHER PUBLICATIONS

International Preliminary Report on Patentability issued in corresponding International PCT Patent Application PCT/US2021/041807 dated Jan. 24, 2023.
(Continued)

*Primary Examiner* — Hibret A Woldekidan

(57) ABSTRACT

A first optical module includes an optical transceiver and a chip. The optical transceiver, subsequent to completion of link training of an in-band transmission link between the first optical module and a host device, waits for a second optical module to come up including transmitting a first awake signal from the first optical module to the second optical module, and receives a second awake signal from the second optical module when the second optical module is up. The chip i) based on a first out-of-band signal transmitted via an out-of-band link, performs the link training of the in-band transmission link independently of an in-band reception link between the first optical module and the host device, and ii) based on the second awake signal and a second out-of-band signal transmitted via the out-of-band link, performs link training of the in-band reception link independent of the in-band transmission link.

23 Claims, 11 Drawing Sheets

(56) References Cited

U.S. PATENT DOCUMENTS

| | | | |
|---|---|---|---|
| 2012/0008938 A1* | 1/2012 | Tang | H04B 10/03 398/9 |
| 2013/0071119 A1 | 3/2013 | Liu et al. | |
| 2013/0163989 A1 | 6/2013 | Wu et al. | |
| 2013/0236138 A1 | 9/2013 | Yamamoto | |
| 2016/0191275 A1 | 6/2016 | Lyubomirsky et al. | |
| 2016/0373186 A1 | 12/2016 | Alshinnawi et al. | |
| 2018/0083964 A1 | 3/2018 | Guo et al. | |
| 2018/0113828 A1* | 4/2018 | Ellis | G06F 5/065 |
| 2019/0044763 A1 | 2/2019 | Shah et al. | |
| 2019/0319741 A1 | 10/2019 | Smith et al. | |
| 2020/0076651 A1 | 3/2020 | Sun et al. | |
| 2020/0228229 A1 | 7/2020 | Farjadrad et al. | |
| 2020/0259936 A1 | 8/2020 | Lusted | |
| 2020/0412586 A1* | 12/2020 | McLoughlin | G06F 13/4282 |
| 2021/0006330 A1 | 1/2021 | McLoughlin | |
| 2022/0029865 A1 | 1/2022 | Rope et al. | |
| 2022/0191124 A1* | 6/2022 | Degrace | H04L 45/28 |
| 2024/0039689 A1* | 2/2024 | Meltser | G06F 1/3253 |

OTHER PUBLICATIONS

IA Title: Common Electrical I/O (CEI)—Electrical and Jitter Interoperability agreements for 6G+ bps, 11G+ bps, 25G+ bps, 56G+ bps and 112G+ bps I/O, OIF Implementation Agreement OIF-CEI-05.0, Common Electrical I/O (CEI) dated May 5, 2022.

IEEE P802.3ck™M/D3.3, Draft Standard for Ethernet Amendment 4: Physical Layer Specifications and Management Parameters for 100 GB/s, 200 GB/s, and 400 GB/s Electrical Interfaces Based on 100 GB/s Signaling, prepared by the LAN/MAN Standards Committee of the IEEE Computer Society, dated Jun. 10, 2022.

Supplementary European Search Report issued in corresponding European Patent Application 21846554.0 dated Nov. 16, 2023.

Ali Ghiasi et al., "Link Training for AUI Based on OB Signaling," IEEE 802.3df Task Force, Montreal, Jul. 13, 2022.

Adee Ran et al., "AUI link training," P802.3df Electrical ad hoc, Jun. 17, 2022.

International Search Report and Written Opinion issued in corresponding PCT Application PCT/US2023/031613 dated Dec. 12, 2023.

* cited by examiner

OUT-OF-BAND BASED INDEPENDENT LINK TRAINING OF IN-BAND LINKS BETWEEN HOST DEVICES AND OPTICAL MODULES

CROSS-REFERENCE TO RELATED APPLICATIONS

This application claims the benefit of U.S. Provisional Application No. 63/403,006, filed on Sep. 1, 2022. This application is related to U.S. application Ser. No. 18/217,252, filed on Jun. 30, 2023 and to U.S. application Ser. No. 17/186,897, filed on Feb. 26, 2021. The entire disclosures of the applications referenced above are incorporated herein by reference.

FIELD

The present disclosure relates to optical modules, and more particularly, to electrical and optical interfaces and corresponding communication between host devices and optical modules on host printed circuit boards (PCBs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Host PCBs, such as packet optical transport platforms (P-OTPs), can include host devices and optical modules. As an example, a host PCB can include one or more host devices and corresponding optical modules. Each of the optical modules of the first host device communicates with an optical module of one or more remotely located host devices of one or more other host PCBs. Communication between the optical modules is over corresponding optical links (or optical channels) via optical media, such as fiber optic cables. The host device(s) and optical module(s) of a single host PCB are referred to as local devices that communicate with each other using short range electrical interfaces.

SUMMARY

A first optical module is disclosed and includes an optical transceiver and a digital signal processing chip. The optical transceiver is configured i) subsequent to completion of link training of an in-band transmission link between the first optical module and a host device, to wait for a second optical module to come up including transmitting a first awake signal from the first optical module to the second optical module, the second optical module is up when powered ON and is in a state to transmit a second awake signal to the first optical module, and ii) to receive the second awake signal from the second optical module when the second optical module is up. The digital signal processing chip is configured i) based on a first out-of-band signal transmitted via an out-of-band link between the first optical module and the host device, to perform the link training of the in-band transmission link independently of an in-band reception link between the first optical module and the host device, and ii) based on the second awake signal and a second out-of-band signal transmitted via the out-of-band link, to perform link training of the in-band reception link between the first optical module and the host device independent of the in-band transmission link, the first out-of-band signal and the second out-of-band signal being control signals for testing the in-band transmission link and the in-band reception link.

In other features, the optical transceiver is configured, subsequent to completing link training of the in-band transmission link, to continue to transmit IDLE signals to the second optical module until receiving the second awake signal.

In other features, the digital signal processing chip is configured to i) receive a LT signal from the host device during link training of the in-band transmission link, and ii) based on a clock signal embedded in the LT signal, synchronize a clock of the first optical module with the clock signal embedded in the LT signal.

In other features, the first optical module further includes a processor configured, during link training of the in-band transmission link, to transmit the first out-of-band signal to the host device to adjust parameters of a transceiver of the host device. The digital signal processing chip is configured to receive the LT signal based on the adjusted parameters of the transceiver of the host device.

In other features, the digital signal processing chip includes a transceiver, and is configured to receive the first out-of-band signal from the host device, and to adjust parameters of the transceiver based on the first out-of-band signal.

In other features, the digital signal processing chip is configured to receive an LT signal from the host device subsequent to adjusting the parameters of the transceiver.

In other features, the digital signal processing chip includes a transceiver and is configured to transmit a LT signal to the host device during link training of the in-band reception link, and based on the LT signal, receive the second out-of-band signal from the host device to adjust parameters of the transceiver.

In other features, the digital signal processing chip includes a transceiver and is configured to receive the second out-of-band signal from the host device to adjust parameters of the transceiver, adjust the parameters, and transmit a LT signal to the host device to train the in-band reception link.

In other features, the digital signal processing chip is configured to transmit the second out-of-band signal to the host device to adjust parameters of a transceiver of the host device, and subsequent to adjusting the parameters of the transceiver of the host device, transmit a LT signal to the host device to train the in-band reception link.

In other features, the optical transceiver is configured i) to receive the second awake signal in response to the first awake signal, or ii) to receive the second awake signal independent of the first awake signal.

In other features, the optical transceiver is configured i) subsequent to completion of link training of the in-band transmission link between the first optical module and the host device, to wait for the second optical module to come up including transmitting the first awake signal from the first optical module to the second optical module via a first optical link, and ii) receive the second awake signal from the second optical module via a second optical link when the second optical module is up.

In other features, the optical transceiver is configured: subsequent to independently training the in-band transmission link, to forward a first reference clock signal to the second optical module; to wait for a second reference clock signals from the second optical module; and to begin training the in-band reception link subsequent to receiving the second reference clock signal.

In other features, a link training method is disclosed and includes: based on a first out-of-band signal transmitted via an out-of-band link between a first optical module and a host device, performing link training of an in-band transmission link between the first optical module and the host device independently of an in-band reception link between the first optical module and the host device, the first out-of-band signal being a control signal for testing the in-band transmission link; subsequent to completion of the link training of the in-band transmission link between the first optical module and the host device, waiting at the first optical module for a second optical module to come up including transmitting a first awake signal from the first optical module to the second optical module, the second optical module is up when powered ON and is in a state to transmit a second awake signal to the first optical module; receiving, at an optical transceiver of the first optical module, the second awake signal from the second optical module when the second optical module is up; and based on the second awake signal and a second out-of-band signal transmitted via the out-of-band link, performing link training of the in-band reception link independently of the in-band transmission link, the second out-of-band signal being a control signal for testing the in-band reception link.

In other features, the method further includes, subsequent to completing link training of the in-band transmission link, transmitting IDLE signals from the optical transceiver of the first optical module to the second optical module until receiving the second awake signal at the first optical module.

In other features, the method further includes: receiving a LT signal from the host device during link training of the in-band transmission link at the first optical module; and based on a clock signal embedded in the LT signal, synchronizing a clock of the first optical module with the clock signal embedded in the LT signal.

In other features, the method further includes: during link training of the in-band transmission link, transmitting the first out-of-band signal from the first optical module to the host device to adjust parameters of a transceiver of the host device; and receiving at the first optical module the LT signal based on the adjusted parameters of the transceiver of the host device.

In other features, the method further includes: receiving the first out-of-band signal from the host device at the first optical module; and adjusting parameters of a transceiver of the first optical module based on the first out-of-band signal.

In other features, the method further includes receiving an LT signal from the host device at the first optical module subsequent to adjusting the parameters of the transceiver.

In other features, the method further includes: transmitting a LT signal from the first optical module to the host device during link training of the in-band reception link; and based on the LT signal, receiving the second out-of-band signal from the host device at a transceiver of the first optical module to adjust parameters of the transceiver.

In other features, the method further includes: receiving the second out-of-band signal from the host device at the first optical module to adjust parameters of a transceiver of the first optical module; adjusting the parameters; and transmitting a LT signal from the first optical module to the host device to train the in-band reception link.

In other features, the method further includes: transmitting the second out-of-band signal from the first optical module to the host device to adjust parameters of a transceiver of the host device; and subsequent to adjusting the parameters of the transceiver of the host device, transmitting a LT signal from the first optical module to the host device to train the in-band reception link.

In other features, the method further includes, via the optical transceiver, receiving the second awake signal in response to the first awake signal, or receiving the second awake signal independent of the first awake signal.

In other features, the method further includes: via the optical transceiver and subsequent to completion of link training of the in-band transmission link between the first optical module and the host device, waiting for the second optical module to come up including transmitting the first awake signal from the first optical module to the second optical module via a first optical link; and receiving at the optical transceiver the second awake signal from the second optical module via a second optical link when the second optical module is up.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
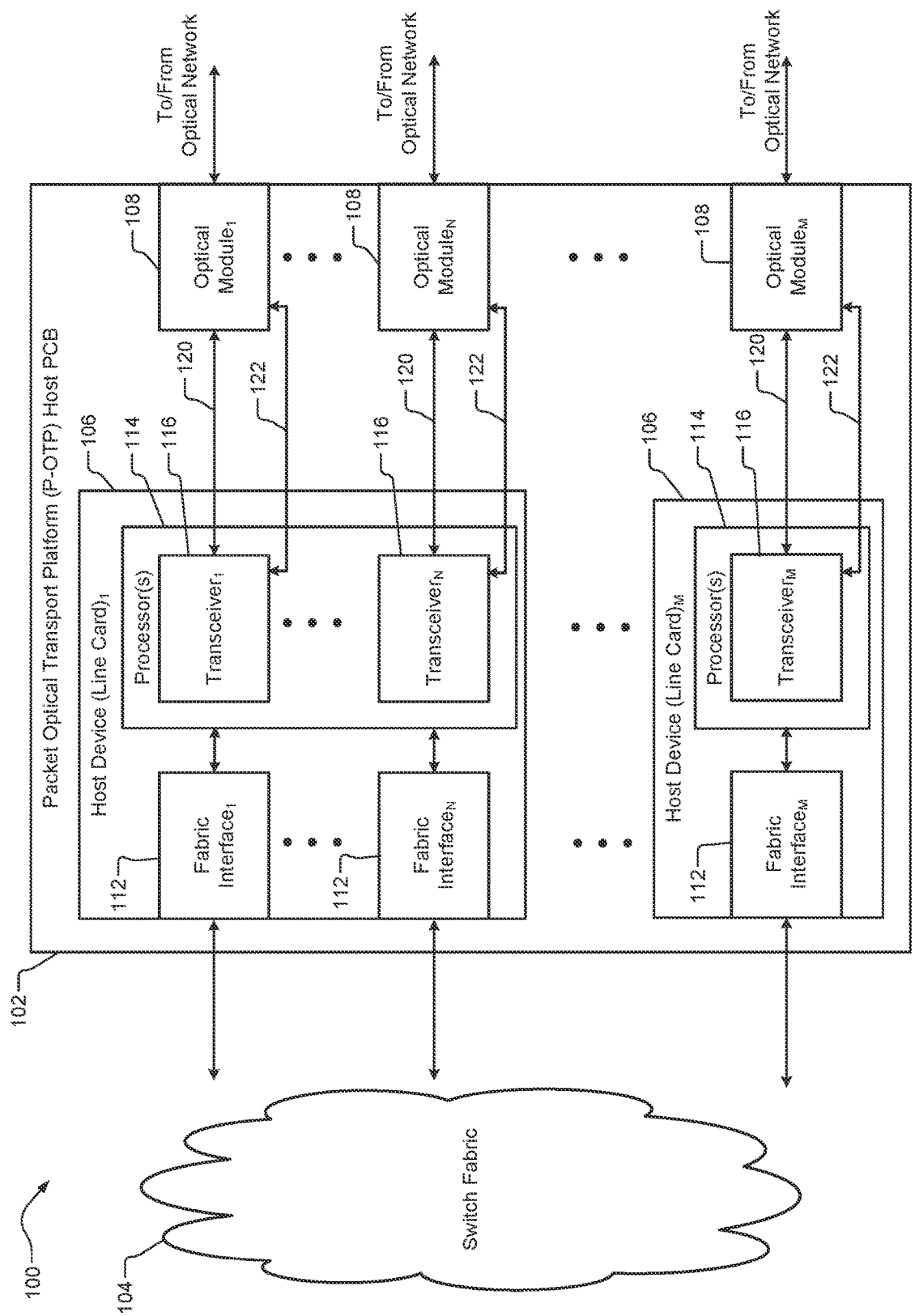
FIG. 1 is a functional block diagram of an example communication system including a P-OTP host PCB implemented between a switch fabric and an optical network and having transceivers and optical modules implementing clock synchronization and link training in accordance with the present disclosure.

Link training between host devices can be conducted using, for example, an Institute of Electrical and Electronics Engineering (IEEE)® 802.3 standard link training (LT) process. The IEEE 802.3 standard LT process includes incrementing and decrementing equalizer tap values of transmitters of the host devices to provide best signal-to-noise ratios (SNRs). The LT process can include testing tap values and tap value combinations to determine which combination of tap values provides the best SNR. This can include incrementing and/or decrementing each tap value and iteratively adjusting previously selected tap values. The testing of tap values can be done for each of multiple equalizers (or filters) of the transmitters of the host devices. The IEEE® 802.3 standard LT process is for training a transmitter and a receiver disposed in respective remote devices communicating over an electrical interface, not for training transmitters and receivers of a host device communicating with an optical module, for instance, over an electrical interface. Also, the LT process is implemented according to a structured protocol that provides interoperability between the host devices.

LT can include testing transmitter settings to determine the best set of transmitter settings to use for in-band signals between host devices and optical modules. An in-band signal refers to a LT signal or a data signal transmitted over an electrical channel between a host device and an optical module. LT between a host device and an optical module can be conducted in a similar manner as traditional IEEE® 802.3 LT. The application of this training to in-band links between a host device and an optical module can however be susceptible to interoperability problems between devices. This is especially true when performing a full auto-negotiation link training (ANLT) process. Each device performing full ANLT has a well-defined starting point for a timer. As an example, two devices can perform full ANLT, to establish a clock start time and a link between the devices prior to transmitting data. The devices establish and as a result know a clock start time and start respective timers at the same start time. In so doing, the devices are synchronized. If however, full ANLT is not performed, such that auto-negotiation is not performed and only LT is performed, then the devices do not have a well-defined start time. As a result, the devices do not know when to start the timers and by default typically start the timers when the devices are turned ON and initialized. The devices are thus at least initially not synchronized.

If the timers of the first and second devices start by default when the devices are initialized, the first device may be ON when the second device is OFF and vice versa. In addition, the first device can transmit a LT request signal to the second device to perform LT and expect a response signal from the second device. However, the second device, if OFF and/or does not detect the LT signal transmitted by the first device, will not respond. This can result in the first device timing out and restarting. The first device may continue LT to restart until receiving a response from the second device. The second device can perform the same LT process. Each of the devices can timeout after a predetermined period of time if response signals are not received. The second device could transmit a signal for LT when the first device times out and/or is restarting. As a result, the devices can continue to "chase" each other for an extended period of time. This is referred to as a "race condition".

For two devices that transmit LT request signals in-band, the pair of unidirectional in-band links between the two devices cannot be decoupled. The first link of the pair is used to transmit signals from the first device to the second device and the second link is used to transmit signals from the second device to the first device. A LT request signal can be transmitted on the first link and a LT response signal can be transmitted on the second link. Both links must be up for this type of LT to be performed. Traditionally, the links are up when the transceivers on opposite ends of the links are powered up and in a state to transmit and receive signals over the links. The first link cannot be trained while the second link is down and vice versa. Also, any restart by one of the devices, requires both links to be retrained including establishing the correct clock timing for each of the links and adjusting transmitter settings such as coefficients of taps of equalizers (or filters), other filter parameters, signal amplitudes, and precoder (or encoder) settings. As an example, a precoder (or encoder) setting can indicate enablement and disablement of encoding.

Two endpoints (e.g., network switches) can perform LT. Each of the end points includes a host device and an optical module. The first optical module of the first end point is connected via optical links to the second optical module of the second end point. Each of the optical modules can operate in a repeater mode and forward data received from the corresponding host device to the other optical module. While operating in the repeater mode, an optical module is not able to generate physical coding sublayer (PCS) data, but rather can only forward received PCS data. The end points can expect to receive PCS data after LT is completed. If the end points do not receive PCS data within a predetermined period of time, the end points restart. When auto-negotiation is not performed, it is difficult to synchronize the two end points such that the end points finish LT at the same time. Finishing at the same time allows PCS data to be transmitted and received when LT is completed. If however, the end points are not synchronized, then PCS data may not be received and the end points timeout and restart at different times. Again, this results in a race condition.

Some optical modules operate in a clock forwarding mode. This refers to transmitting LT signals over electrical and optical links that include clock signals. This allows the transmitters and receivers of the optical modules and host devices to synchronize respective clocks, based on which subsequent data signals are transmitted. For end points including host devices and optical modules, a situation can arise where synchronization does not occur. For example, in order for a transmitter and output port (HTX) of a first optical module to have a stable correctly timed clock, an optical receiver and input port (LRX) of the first optical module needs to be up (i.e., active and providing a stable correct clock signal). In order for the optical receiver of the first optical module to be up, the transmitter and output port (LTX) of the second optical module needs to be up. In order for the optical transmitter of the second optical module to be up, the receiver and input port (HRX) of the second optical module needs to be up. HTX, with respect to the first optical module, refers to transmission by the transmitter of the first optical module via an output port to the first host device. LRX, with respect to the first optical module, refers to reception by the optical receiver of the first optical module of a signal via an input port from the second optical module. LTX, with respect to the second optical module, refers to transmission by the transmitter of the second optical module via an output port to the first optical module. HRX, with respect to the second optical module, refers to reception by the receiver of the second optical module of a signal via an input port from the second host device. Each of the optical modules have respective HTX, LRX, LTX, HRX ports.

The examples set forth herein include training unidirectional electrical links (also referred to as in-band links) between host devices and optical modules independently of each other. The unidirectional links are trained based on out-of-band signals transmitted on out-of-band links. As an example, two in-band links between a host device and an optical module are trained independently, such that one of the in-band links is trained while the other in-band link is down (i.e., not active and/or trained). During LT, one or more out-of-band signals are transmitted on an out-of-band link between out-of-band interfaces of the host device and the optical module. The use of an out-of-band link decouples the LT of the in-band links (or links of an in-band link pair) between a host device and an optical module and is unlike the IEEE 802.3 standard LT process, which does not include an out-of-band link and requires that both in-band links are up in order to perform LT. Each in-band link in the disclosed examples is trained when that link is up and a reference clock frequency to synchronize the transmitter of that link is available. This does not require that the other in-band link in the corresponding in-band link pair be up.

An out-of-band signal refers to a signal transmitted over a second electrical channel (or management channel) between the host device and the optical module. Signals transmitted over the second electrical channel are at a same or different frequency as signals transmitted over a first electrical channel of an in-band link. The second electrical channel is used to transmit control information including, for example, coefficients, number of taps, signal integrity values, requests, status information, etc. between the host device and the optical module. The out-of-band link is not used for transferring data between host devices, but rather in-band signals are used for transferring data between host devices. The in-band signals originate at host devices and/or are transmitted from optical modules to host devices. As an example, Ethernet data to be transmitted originates at the host devices. The signal integrity values include SNRs, bit error rates (BERs), etc.

The examples disclosed herein further include end points (or host PCBs) that are configured to perform LT of in-band transmission links independently of each other. Each of the host PCBs is configured to train a respective in-band transmission link and transmit IDLE (or dummy) signals on an optical link until receiving a response and/or awake signal from the other host PCB. The IDLE signals are transmitted when a transmit in-band link of a first host device has been trained. The IDLE signals are transmitted from a corresponding first optical module of the first host device to a second optical module of a second host device to indicate that the transmit in-band link of the first host device has been trained and to forward a reference clock for the second optical module. This process is also performed by the second host device. The IDLE signals are configured similarly to normally transmitted data signals, but do not include data that is transmitted between host devices. IDLE signals include dummy bits that are transmitted between optical modules to maintain the optical modules in active wait states. Normal data signals can include messages, whereas IDLE signals do not include messages. The transmission of the IDLE signals prevents each of the optical modules from timing out and restarting due to lack of response from the other optical module. In an embodiment, the IDLE signals include codewords. The IDLE signals do include clock signals, which allow optical modules receiving the IDLE signals to i) synchronize optical receivers, and ii) enable synchronization of transmitters transmitting in-band signals to host devices.

FIG. 1 shows a communication system 100 including a P-OTP host PCB 102 implemented between a switch fabric 104 and an optical network. The P-OTP host PCB 102 includes host devices 106 and optical modules 108, which are mounted on the P-OTP host PCB 102. Each of the host devices 106 includes one or more fabric interfaces 112 and one or more processors 114. Each of the processors 114 includes one or more transceivers 116. In the shown embodiment, the host devices 106 are implemented as line cards. The host devices 106 and the optical modules 108 are configured and operate similarly as any of the host devices and optical modules disclosed and described herein. During operation, data is transferred between the switch fabric 104 and the fabric interfaces 112, between the transceivers 116 and the optical modules 108 via in-band links (or channels) 120, and between the optical modules 108 and the optical network. Control information is transferred via out-of-band links (or channels) 122. In an embodiment, the out-of-band links 122 each include a two-wire interface (TWI) or a high-speed differential four-wire interface that connect processors of host devices to optical modules for setting basic functions and for performing link training operations.

The in-band links 120 transmit test patterns or Ethernet data and the out-of-band links 122 are used for link training of the in-band links 120 as further described below. The host devices 106 and optical modules 108 implement the methods of FIGS. 10-11. Communication between the host devices 106 and the optical modules 108 is conducted over very short range (VSR) electrical interfaces (or VSR in-band electrical links). Although VSR electrical interfaces typically refer to interfaces that are less than and up to 300 mm in length, the VSR electrical interfaces referred to herein are substantially shorter than 300 mm. In some embodiments, the host devices disclosed herein are directly connected to the corresponding optical modules.

Figure 2:
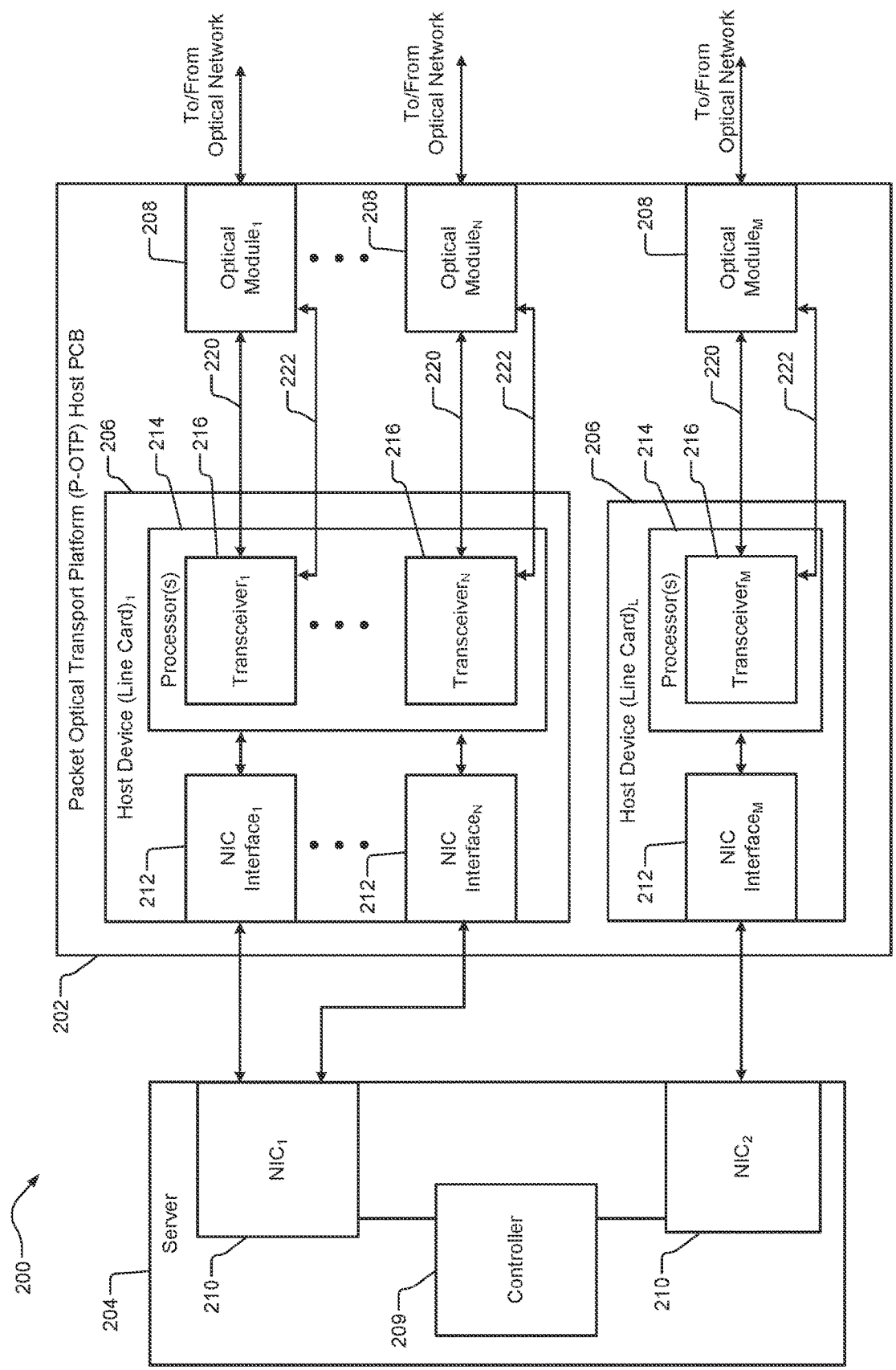
FIG. 2 is a functional block diagram of an example communication system including a P-OTP host PCB implemented between a server and an optical network and having transceivers and optical modules implementing clock synchronization and link training in accordance with the present disclosure.

FIG. 2 shows a communication system 200 including a P-OTP host PCB 202 implemented between a server 204 and an optical network. The P-OTP host PCB 202 includes host devices 206 and optical modules 208, which are mounted on the P-OTP host PCB 202. The server 204 includes a controller 209 and one or more network interface cards (NICs) 210. Each of the host devices 206 includes one or more NIC interfaces 212 connected to the NICs 210 and one or more processors 214. Each of the processors 214 includes one or more transceivers 216. In the shown embodiment, the host devices 206 are implemented as line cards. The host devices 206 and the optical modules 208 are be configured and operate similarly as any of the host devices and optical modules disclosed and described herein. During operation, data is transferred between the NICs 210 and the NIC interfaces 212, between the transceivers 216 and the optical modules 208 via in-band links (or channels) 220, and between the optical modules 208 and the optical network. Control information is transferred via out-of-band links (or channels) 222. In an embodiment, each of the out-of-band links 222 includes a TWI or a high-speed differential four-wire interface that connects processors of host devices to optical modules for setting basic functions and for performing link training operations. The in-band links 220 and the out-of-band links 222 are used for link training of the in-band links 220 as further described below. The host devices 206 and optical modules 208 are configured to implement the methods of FIGS. 10-11.

The controller 209 may refer to one or more processors and memory, where the one or more processors are configured to execute instructions to perform the described operations. In an embodiment, the instructions are stored in the memory of the one or more processors. The term "controller" may be replaced with the term "circuit". The memory of the one or more processors includes a non-transitory, tangible computer-readable medium.

Figure 3:
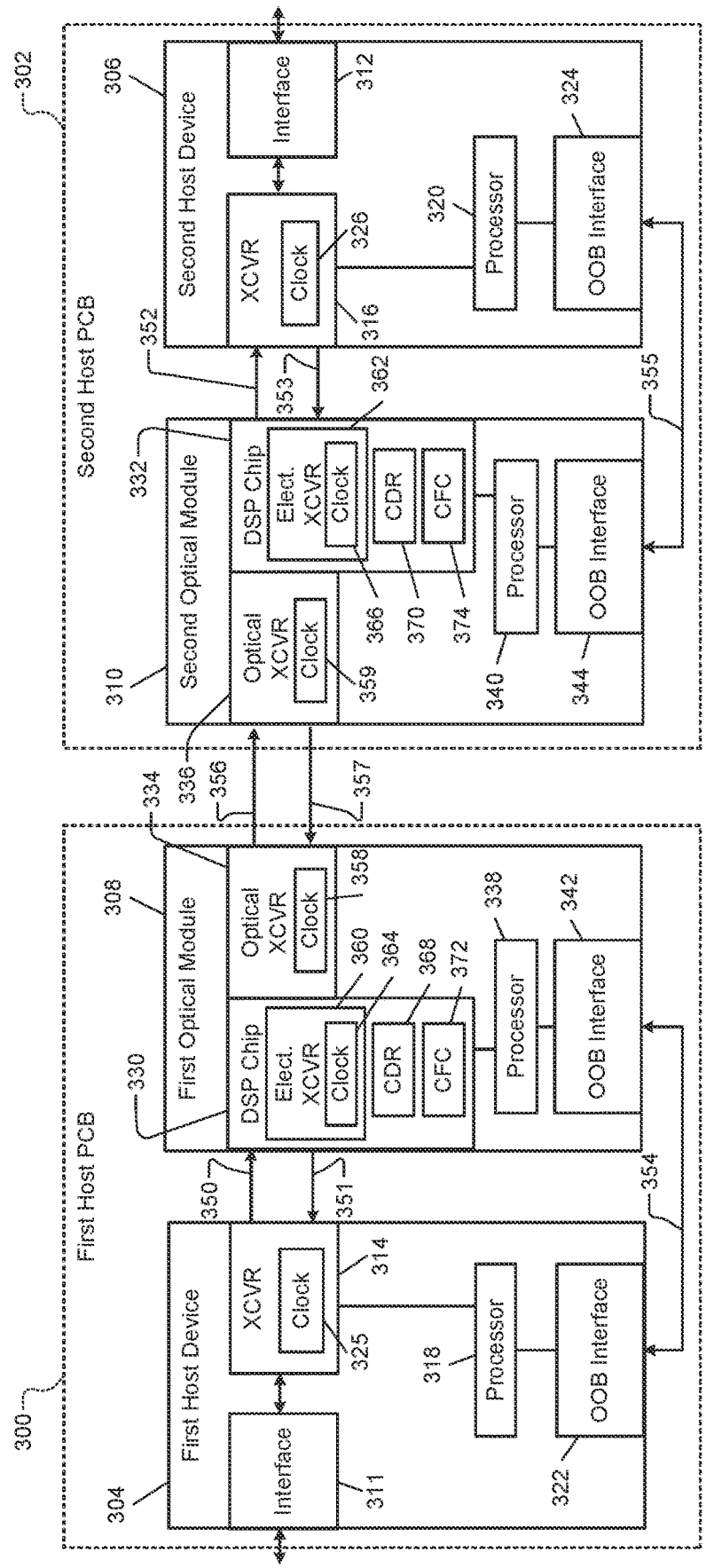
FIG. 3 is a functional block diagram of example first and second host PCBs including host devices and optical modules implementing clock synchronization and link training in accordance with the present disclosure.

FIG. 3 shows first and second host PCBs 300, 302 including host devices 304, 306 and optical modules 308, 310 implementing link training. In an embodiment, the host PCBs 300, 302 are implemented as P-OTP host PCBs, such as those shown in FIGS. 1-2. In another embodiment, the host PCBs 300, 302 are in communication with or are implemented as network switches.

The host devices 304, 306 include interfaces 311, 312, transceivers 314, 316, processors 318, 320, and out-of-band (OOB) interfaces 322, 324. In an embodiment, the interfaces 311, 312 are in communication with a switch network, servers, and/or NICs. In an embodiment, the transceivers 314, 316 include respective clocks 325, 326.

The optical modules 308, 310 include digital signal processing (DSP) chips 330, 332, optical transceivers 334, 336, processors 338, 340 and OOB interfaces 342, 344. In-band electrical links 350, 351 exist between the transceiver 314 and the DSP chip 330. In-band electrical links 352, 353 exist between the transceiver 316 and the DSP chip 332. An OOB electrical link 354 exists between the OOB interfaces 322, 342. An OOB electrical link 355 exists between the OOB interfaces 324, 344. Optical links 356, 357 exist between the optical transceivers 334, 336. The in-band electrical links 350-353 and the optical links 356, 357 are unidirectional links. The OOB electrical links 354, 355 are bidirectional links. The optical transceivers 334, 336 include respective clocks 358, 359.

The DSP chips 330, 332 include: electrical transceivers 360, 362 with clocks 364, 366; clock data recovery (CDR) circuits 368, 370; and clock forwarding circuits (CFCs) 372, 374. In an embodiment, the CDR circuits 368, 370 monitor frequency of bits received to determine clock timing. The timing of the clocks 364, 366 are adjusted based on the monitored frequency. In an embodiment, timing including frequency and phase of the clocks 364, 366 are synchronized to the monitored frequency. This includes matching the frequencies and phases of the clocks 364, 366 to that of incoming signals. The CFCs 372, 374 govern the frequency and phase of bits transmitted on the optical links 356, 357. This includes adjusting frequency and phase of the clocks 358, 359 based on which bits are transmitted on the optical links 356, 357.

The clocks 325, 326, 358, 359, 364, 366 are shown as examples. In an embodiment, instead of the clocks 325, 326 being implemented by the transceivers 314, 316, are implemented by the processors 318, 340 and/or external to the transceivers 314, 316. In an embodiment, the optical modules 308, 310, instead of having two clocks each and the clocks being implemented by the transceivers 334, 336, 360, 362, have a single clock each. The single clocks of the optical modules 308, 310 are implemented by the processors 338, 340, by selected ones of the transceivers 334, 336, 360, 362, by the DSP chips 330, 332, and/or are separate from the transceivers 334, 336, 360, 362.

Figure 10:
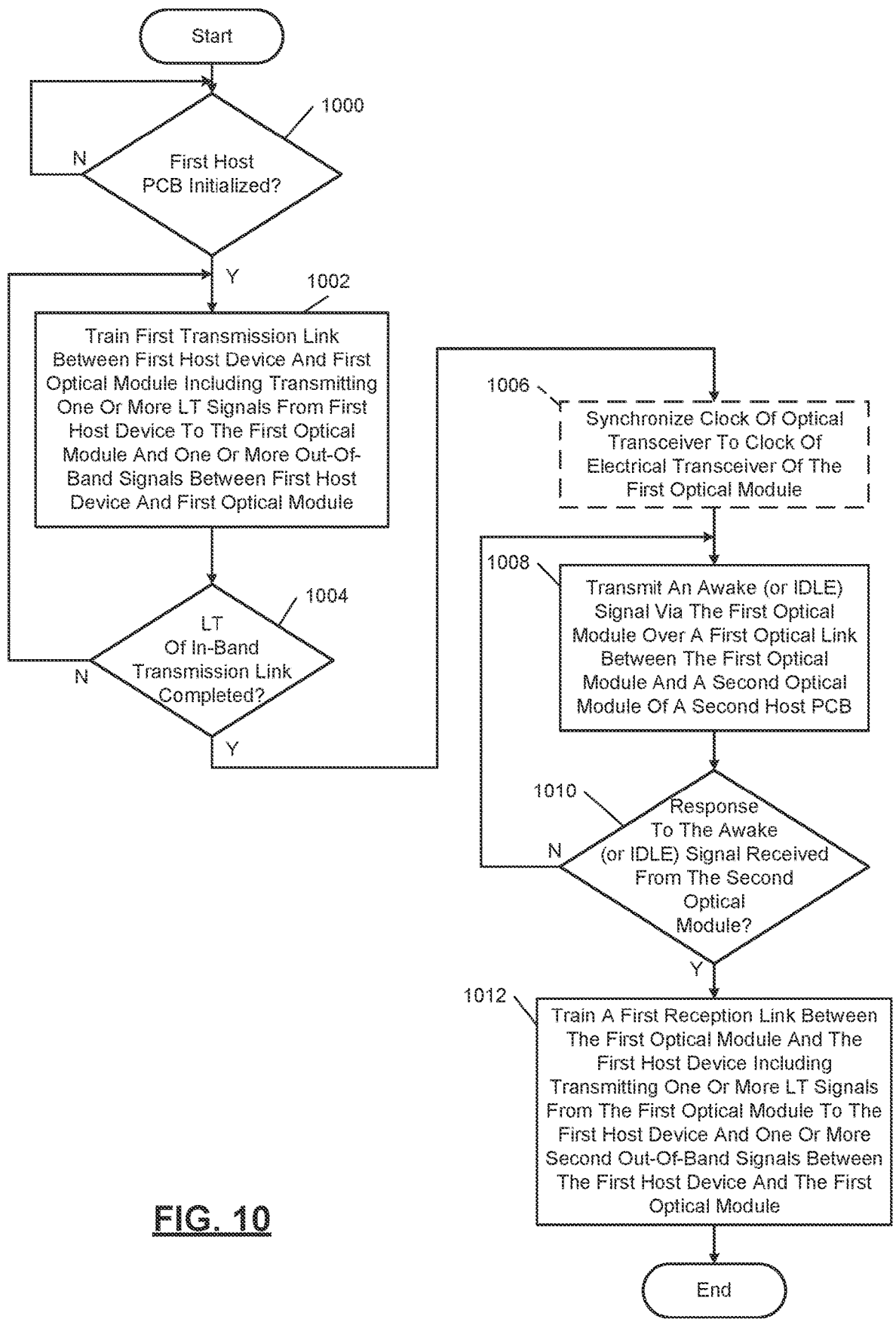
FIG. 10 illustrate link training method including operations implemented by a first host PCB in accordance with the present disclosure.
Figure 11:
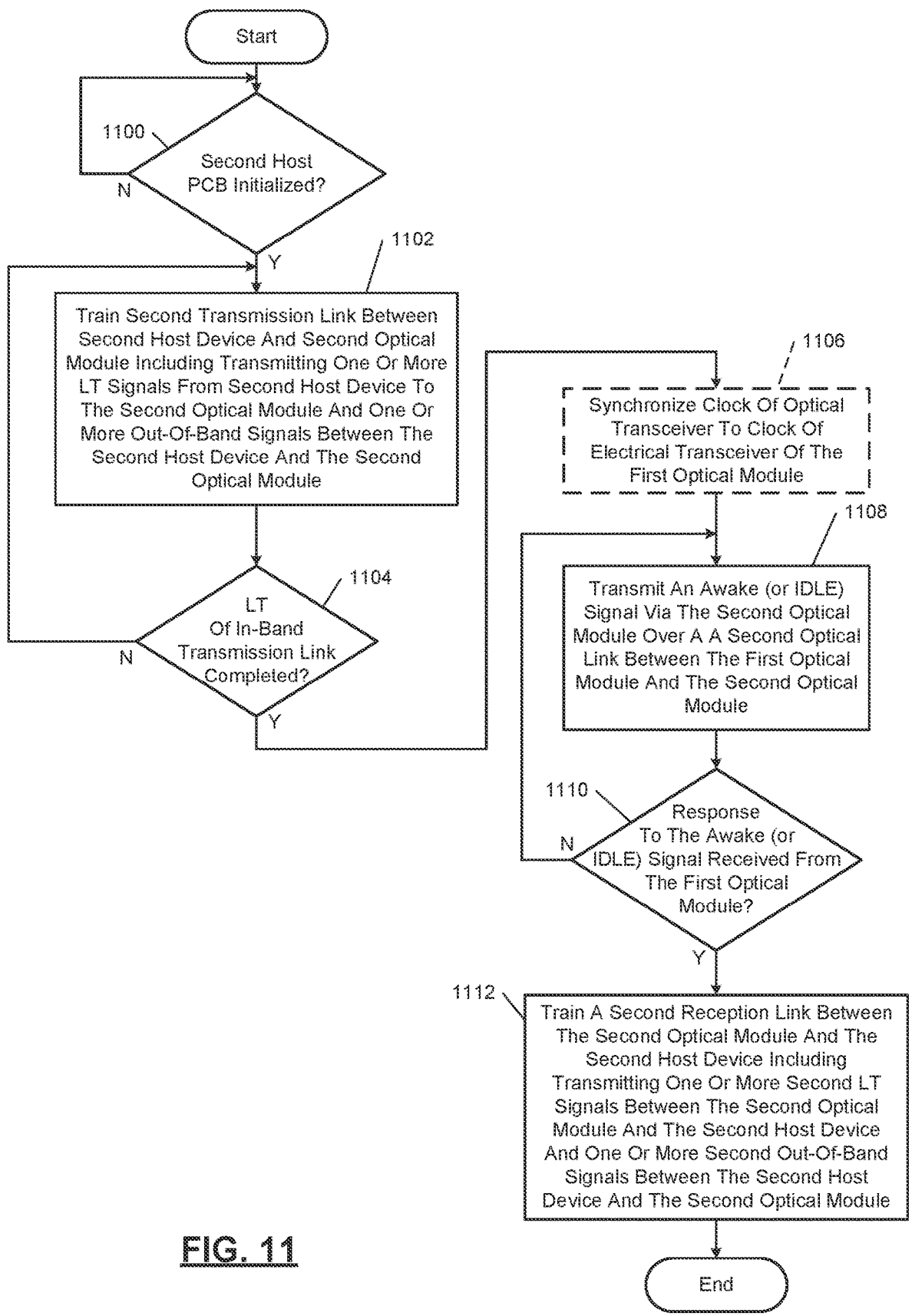
FIG. 11 illustrate link training method including operations implemented by a second host PCB in accordance with the present disclosure.

The host devices 304, 306 and optical modules 308, 310 are configured to implement the methods of FIGS. 10-11. The OOB electrical links 354, 355, as well as other OOB electrical links and interfaces disclosed herein, are used for link training purposes and in some embodiments have data rates that are significantly slower than data rates of an in-band links (or data communication channels). As an example, a data rate of an in-band interface (or data communication link) can have a 112 gigabits per second (Gbps) channel, whereas an out-of-band interface (or management link used to transfer control information) can have a 1 kilobits per second (kbps) to 1 megabits per second (1 Mbps) channel. In some embodiments, the OOB electrical links 354, 355 are out-of-band TWIs or high-speed differential four-wire interfaces that connect processors of host devices to optical modules for setting basic functions and for performing link training operations.

The OOB electrical links 354, 355 may be referred to as management channels that are used to train the In-band electrical links 350-353 (or in-band electrical interfaces). The communication between the host devices 304, 306 and optical modules 308, 310 is referred to as chip-to-module (C2M) communication. The host devices 304, 306 include the transceivers 314, 316, which include transmitters, receivers, adaptation applications, and LT applications, as further described below. The OOB electrical links 354, 355 carry training commands and responses, such that corresponding exchanges are not vulnerable to signal quality of in-band data link signals on the in-band links being trained. The OOB electrical links 354, 355 are used for adjusting settings of transmitters of the transceivers 314, 316, 360, 362.

An indication of a selected set of transmitter settings includes at least one of an index value, a preset, and the selected set of transmitter settings. Each index value and preset refers to a set of transmitter parameters including a set of coefficients for respective taps of an equalizer (or filter). Each index value identifies a set of parameters but does not include the set of parameters. In an embodiment, a preset refers to and includes a current set of transmitter settings including a set of coefficients for taps of an equalizer (or filter) or another prestored set of coefficients for the taps of the equalizer. The transmitter settings are not limited to coefficients and can include other transmitter settings, as further described below. The transmitter settings may refer to any of the transmitter settings referred to herein including tap values, signal amplitudes, filter parameters, etc. The filter parameters include: frequencies or frequency ranges to filter out and/or to emphasize; types of filtering to be performed; etc. The types of filtering include peak filtering, low pass filtering, high pass filtering, notch filtering, band-pass filtering, etc.

Each of the host devices 304, 306 has an independent clock source (e.g., clocks 325, 326). In an embodiment, the frequencies of the clocks 325, 326 is the same nominal frequency, but may be slightly off due to part-to-part variations and/or other reasons. In an embodiment, the frequencies of the clocks 325, 326 differ by up to ±100 parts-per-million (ppm) (i.e., 0.01%). The signals transmitted on in-band transmission link 350 are governed by the frequency of the clock 325 and the signals transmitted on in-band transmission link 353 are governed by the frequency of the clock 326.

The first optical module 308 takes a CDR recovered clock frequency from a signal transmitted over the in-band transmission link 350 and forwarded it to optical link 356. This is done such that the frequency on optical link 356 matches the frequency on in-band transmission link 350. The clock 364 generates a reference clock signal with frequency that is nominally the same (±100 ppm) as the clock frequency of clock 325. The CDR circuit 368 modifies frequency of clock 364 to match the frequency of the clock 325. The second optical module 310 takes a CDR recovered clock frequency from the optical link 356 and makes the frequency on in-band reception link 352 match that frequency. As a result, the clock frequency (or clock signal) is forwarded from the clock 325 to the in-band reception link 352.

The second optical module 310 likewise takes a CDR recovered clock frequency from a signal transmitted over the in-band transmission link 353 and forwarded it to optical link 357. This is done such that the frequency on optical link 357 matches the frequency on in-band transmission link 353. The clock 366 generates a reference clock signal with frequency that is nominally the same (±100 ppm) as the clock frequency of clock 326. The CDR circuit 370 modifies frequency of clock 366 to match the frequency of the clock 326. The first optical module 308 takes a CDR recovered clock frequency from the optical link 357 and makes the frequency on in-band reception link 351 match that frequency. As a result, the clock frequency (or clock signal) is forwarded from the clock 326 to the in-band reception link 351.

Thus, the clock forwarding process in a first direction operates independently from a clock forwarding process in an opposite direction.

Figure 4:
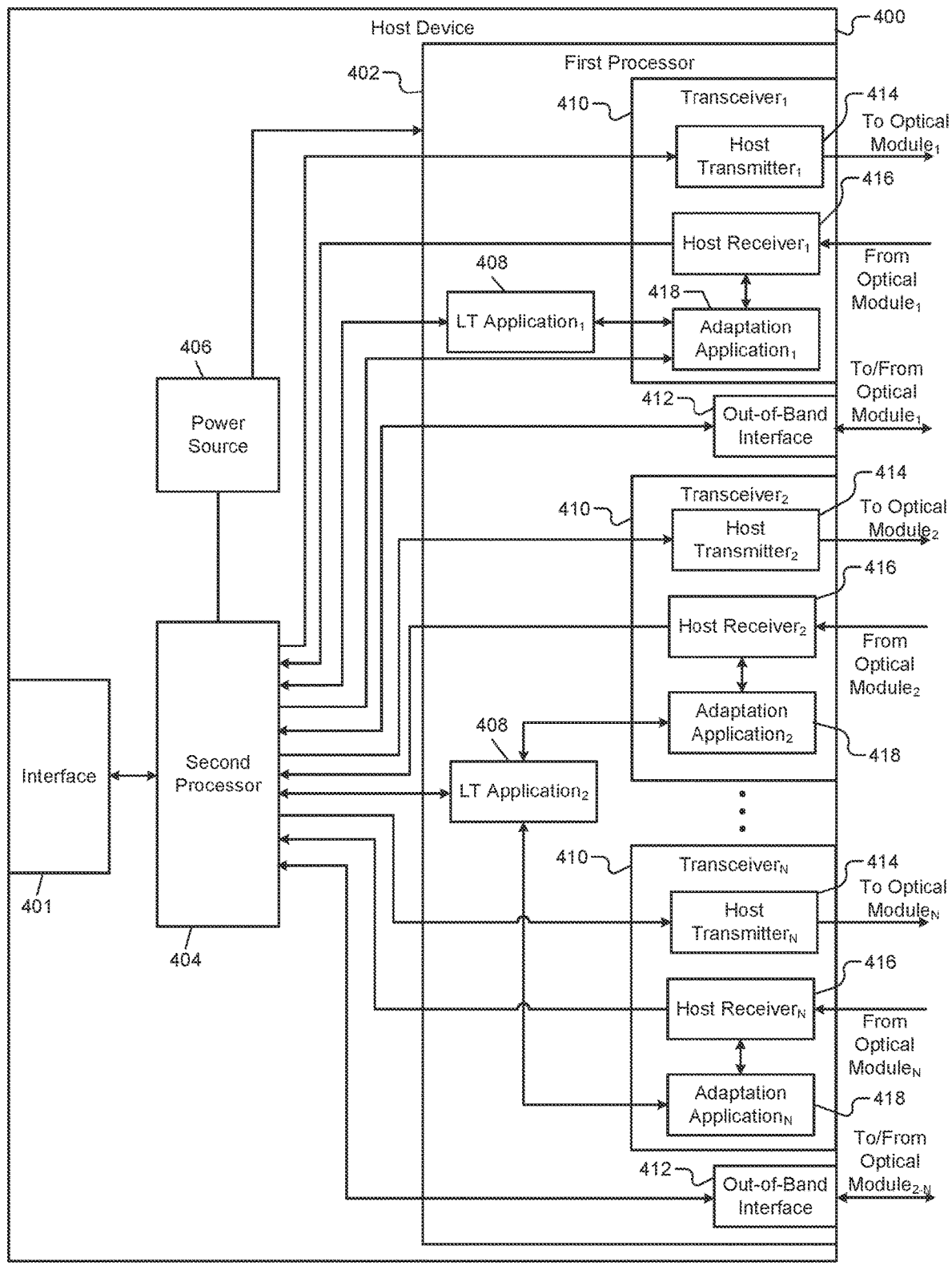
FIG. 4 is a functional block diagram of an example host device including processors, link training applications, transceivers with adaptation applications, and out-of-band interfaces in accordance with the present disclosure.

FIG. 4 shows a host device 400 including an interface 401, processors 402, 404, a power source 406, LT applications 408, transceivers 410, and out-of-band interfaces 412. In some embodiments, the host device 400 replaces one of the host devices of FIGS. 1-3. The interface 401 is a fabric interface, a NIC interface, or other electrical interface. In an embodiment, the LT applications 408 are stored in memory of the processor 402 and executed by the processor 402. Although the LT applications 408 are shown separate from the transceivers 410, the LT applications 408 may be stored in memory of the transceivers 410 and executed by the transceivers 410. The transceivers 410 include host transmitters 414, host receivers 416, and adaptation applications 418. In an embodiment, the adaptation applications 418 are stored in memory of the transceivers 410 and executed by the transceivers 410.

The second processor 404 transfers data between the interface 401 and the host transmitters 414 and host receivers 416. The transceivers 410 transfer data between the first processor 402 and respective optical modules via in-band electrical links. The second processor 404 controls powering the first processor 402 via the power source 406. The LT applications 408 are configured to perform link training operations based on signal integrity values. The adaptation applications 418 are configured to determine the signal integrity values of signals received via the host receivers 416. The adaptation applications 418 are also configured to adjust tap values of the transmitters of the optical modules by having requests sent via the OOB interfaces 412. The adjustment of the tap values is based on instructions generated by the LT applications 408 and/or second processor 404. The adaptation applications 418 and LT applications 408 are configured similarly as other adaptation applications and LT applications disclosed herein. The second processor 404 monitors signal integrity values and, in an embodiment, controls link training of in-band electrical links between the host device 400 and the optical modules by controlling and/or signaling the LT applications and using the OOB interfaces 412 to transfer control information. The control information includes: tap coefficients; signal amplitudes; encoding enablement and disablement indicators; increment, decrement and/or jump instructions; and/or other transmitter settings and requests.

In an embodiment the second processor 404 is configured to: bring up a link; check signal quality of the link in current state with current transmitter parameters; if current signal quality does not pass a predetermined criteria; test a finite set of presets of transmitter settings; and if none of the presets satisfy the predetermined criteria, invoke link training. The link training is implemented by i) the second processor 404, or by ii) the first processor 402 or a processor of a corresponding link partner (i.e., a corresponding optical module).

Figure 5:
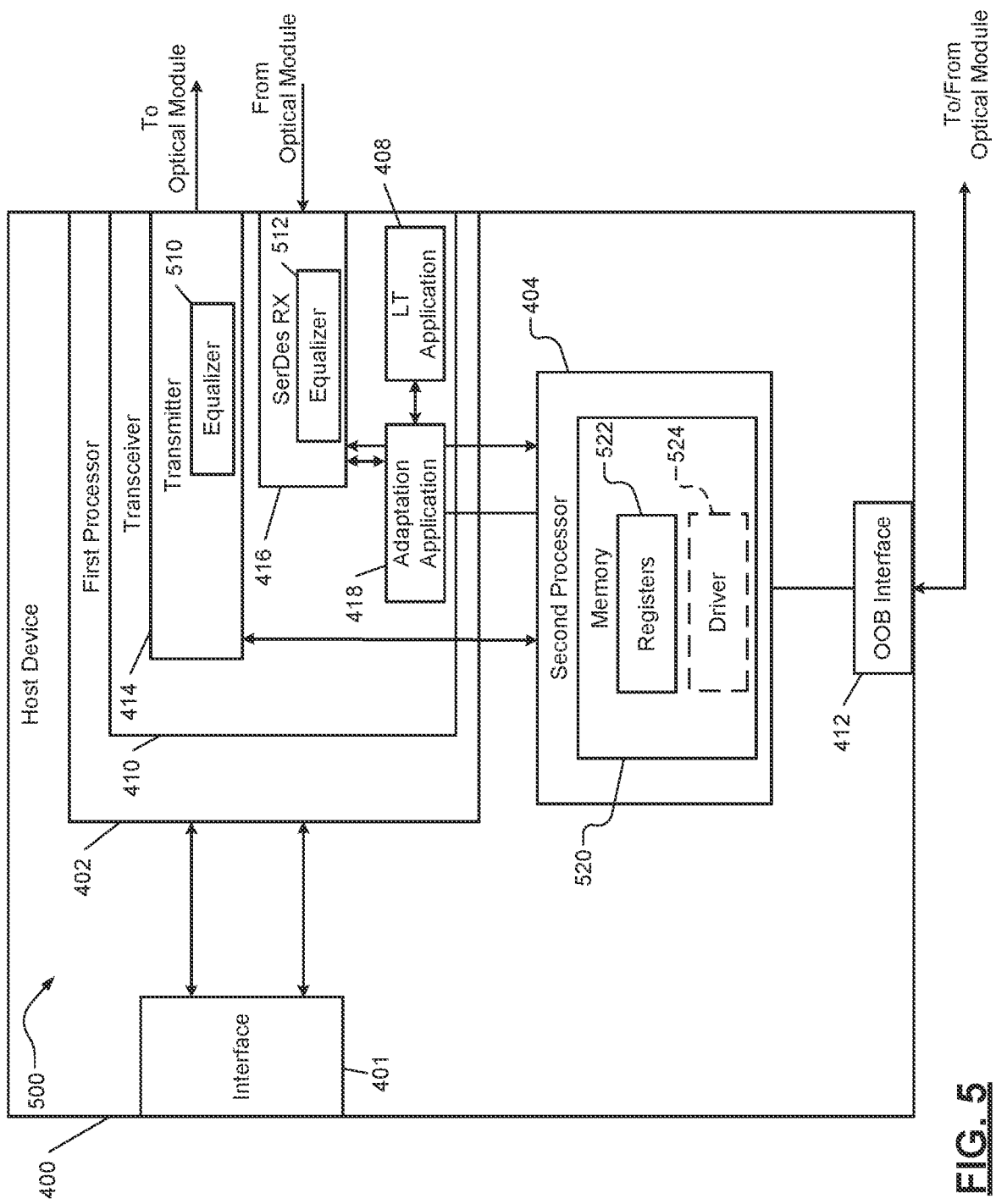
FIG. 5 is a functional block diagram illustrating an example detailed portion of the host device of FIG. 4 in accordance with the present disclosure.

FIG. 5 shows a portion 500 of the host device 400 of FIG. 4. The portion 500 includes the interface 401, the first processor 402, the second processor 404 and the OOB interface 412. The first processor 402 includes transceiver 410, which includes transmitter 414, receiver 416, adaptation application 418 and LT application 408. In the embodiment shown, the receiver 416 is implemented as a SerDes receiver that deserializer received data. The transmitter 414 and the receiver 416 include respective equalizers 510, 512, which each have taps with corresponding coefficients. In an embodiment, the transmitter 414 includes and/or performs the function of an encoder and the receiver 416 includes and/or performs the function of a decoder. In an embodiment, the encoder and decoder include a forward error correction (FEC) encoder and a FEC decoder. The encoder and decoder provide error detection and/or correction. The adaptation applications 418 monitor received signals and determine signal integrity values. The LT application 408 and the adaptation application 418 perform low-level link training of the transmitter of the optical module (not shown in FIG. 5), which is in communication with the first processor 402 via the corresponding in-band electrical interface. Low-level link training includes iteratively tuning and testing parameters of a transmitter, as further described below. The LT application 408 and/or adaptation application 418 sends a request to the second processor 404 to signal the optical module to change tap value(s) of the transmitter of the optical module and resend data via the transmitter of the optical module over the in-band electrical interface. The request is sent from the second processor 404 via the OOB interface 412 and in an embodiment, includes transmitter parameters such as coefficients, amplitudes, and/or other transmitter parameters. This indicates to the optical module how to adjust the transmitter settings of the transmitter of the optical module.

The second processor 404 may include memory 520 that includes registers 522 and optionally stores a driver 524. In an embodiment, the second processor does not include a driver. In an embodiment, the host device 400 does not include a driver. The registers 522 store transmitter parameters to be sent to the optical module or transmitter parameters received from the optical module. In an embodiment, the optical module when adjusting parameters of the transmitter 414, stores transmitter parameters in the registers 522, which are accessed by the second processor 404 and provided to the transmitter 414.

Figure 6:
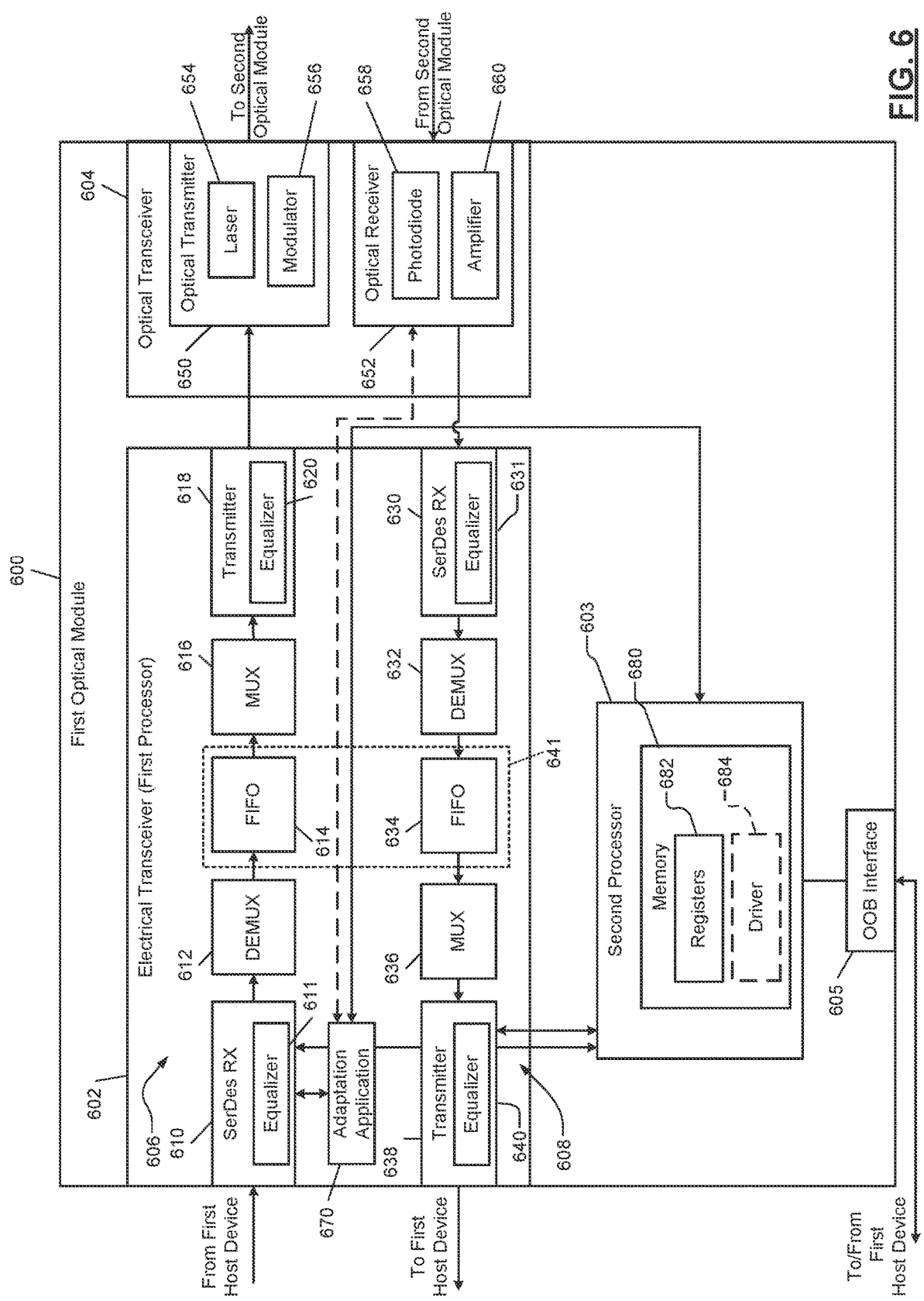
FIG. 6 is a functional block diagram of an example optical module including two processors, one of which including multiplexers, demultiplexers, and first-in-first-out (FIFO) memory in accordance with an embodiment of the present disclosure.

FIG. 6 shows an optical module 600 that may replace any of the optical modules disclosed herein. The optical module 600 includes processors 602, 603, optical transceiver 604, and an OOB interface 605. The processor 602 includes a receive path 606 and a transmit path 608. Although the processor 602 is shown having a signal transmit path and a single receive path, the processor 602 includes any number of transmit and receive paths configured similarly as the shown transmit and receive paths and thus transmits and receives in-band signals to and from any number of host processors. The receive path 606 includes: a SerDes receiver 610 with an equalizer 611; a demultiplexer 612; a FIFO memory 614; a multiplexer 616; and a transmitter 618 with an equalizer 620. The transmit path 608 includes: a SerDes receiver 630 with an equalizer 631; a demultiplexer 632; a FIFO memory 634; a multiplexer 636; and a transmitter 638 with an equalizer 640. In an embodiment, the FIFO memories 614, 634 are implemented as a single FIFO memory 641. In an embodiment, the transmitters 618 and 638 include or perform the functions of encoders and the receivers 610, 630 include and/or perform the functions of decoders. In an embodiment, the encoders and decoders include FEC encoders and FEC decoders. The encoders and decoders provide error detection and/or correction. In an embodiment, the transmitter 618 includes and/or performs the function of a pulse amplitude module driver. The optical transceiver 604 includes an optical transmitter 650 and an optical receiver 652. The optical transmitter 650 includes a laser 654 and a modulator 656. The optical receiver 652 includes a photodiode 658 and an amplifier 660.

The first processor (also referred to as an electrical transceiver) 602 further includes an adaptation application 670, which is in communication with the second processor 603 and in an embodiment is in communication with the optical receiver 652. The adaptation application 670 monitors signal integrity values of signals received via the SerDes receiver 610, and optionally signal integrity values of signals received via the optical receiver 652 and sends requests to the second processor 603 to adjust transmitter parameters of the transmitter of the host device.

The second processor 603 includes a memory 680 that has registers 682 and optionally stores a driver 684. In an embodiment, the second processor 603 does not include a driver. In an embodiment, the optical module 600 does not include a driver. The registers 682 store transmitter parameters to be sent to a host device or transmitter parameters received from the host device. In an embodiment, the host device when adjusting parameters of the transmitter 638, stores transmitter parameters in the registers 682, which are accessed by the second processor 603 and provided to the transmitter 638.

In an embodiment, the SerDes receiver 610 is configured to receive incoming data at 25 Gbps in a pulse amplitude modulated format. The received data is processed and transmitted via the modulator 656 over an optical link to another optical module downstream from the optical module 600. As a few examples, the data is transmitted over the optical link at 40 Gbps, 100 Gbps, 400 Gbps, or at another data rate. The SerDes receiver 610 or the demultiplexer 612 includes and/or performs the function of a CDR circuit. The demultiplexer 612 demultiplexes a received signal into multiple data streams, which are stored in the FIFO memory 614. The multiplexer 616 multiplexes the data streams into a single data signal that is provided to the transmitter 618.

The amplifier 660 receive an optical data signal from the optical link and amplifies the optical data signal. The optical receiver converts the output of the amplifier 660 from an analog signal to a digital signal prior to being received at the SerDes receiver 630. The digital signal is converted into a pulse amplitude modulated form via the transceiver 602 and/or transmitter 638 prior to being transmitted by the transmitter 638. In an embodiment, the transmitter 638 transmits the data at 25 Gbps. The demultiplexer 632 demultiplexes the digital signal into multiple data streams, which are stored in the FIFO memory 634. The multiplexer 636 multiplexes the data streams into a single data signal that is provided to the transmitter 638.

Figure 7:
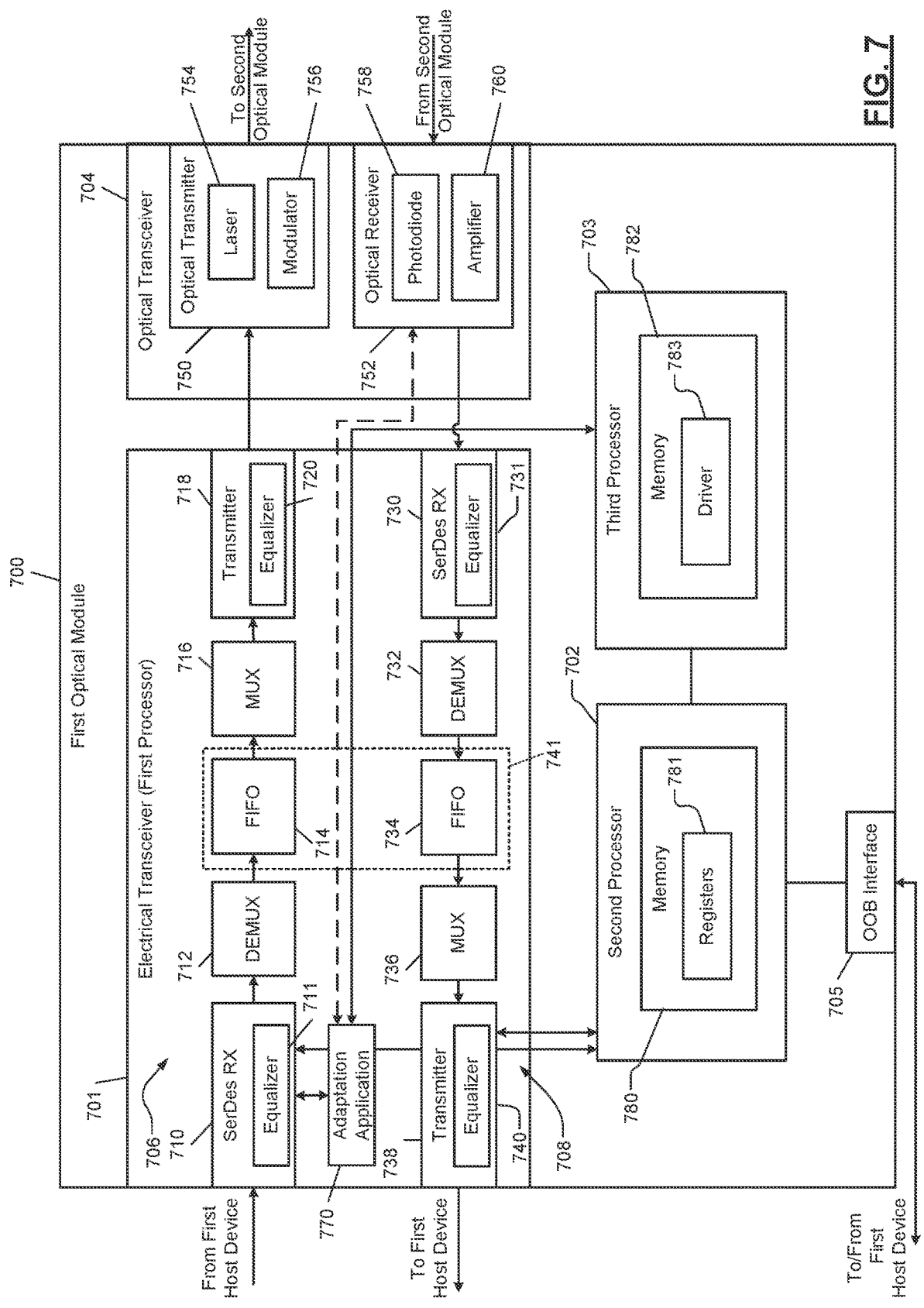
FIG. 7 is a functional block diagram of another example optical module including three processors in accordance with another embodiment of the present disclosure.

FIG. 7 shows an optical module 700 that may replace any of the optical modules disclosed herein. The optical module 700 includes processors 701, 702, 703, optical transceiver 704, and an OOB interface 705. The processor 702 includes a receive path 706 and a transmit path 708. Although the processor 702 is shown having a signal transmit path and a single receive path, the processor 702 includes any number of transmit and receive paths configured similarly as the shown transmit and receive paths and thus transmits and receives in-band signals to and from any number of host processors. The receive path 706 includes: a SerDes receiver 710 with an equalizer 711; a demultiplexer 712; a FIFO memory 714; a multiplexer 716; and a transmitter 718 with an equalizer 720. The transmit path 708 includes: a SerDes receiver 730 with an equalizer 731; a demultiplexer 732; a FIFO memory 734; a multiplexer 736; and a transmitter 738 with an equalizer 740. The demultiplexers 712, 732 convert serial data to parallel data. The data is then processed prior to and/or subsequent to being stored in the FIFO memories 714, 734. The processed parallel data is then converted to serial data via the multiplexers 716, 736. In an embodiment, the FIFO memories 714, 734 are implemented as a single FIFO memory 741. The optical transceiver 704 includes an optical transmitter 750 and an optical receiver 752. The optical transmitter 750 includes a laser 754 and a modulator 756. The optical receiver 752 includes a photodiode 758 and an amplifier 760.

The first processor (also referred to as an electrical transceiver) 701 further includes an adaptation application 770, which is in communication with the third processor 703 and in an embodiment is in communication with the optical receiver 752. The adaptation application 770 monitors signal integrity values of signals received via the SerDes receiver 710, and optionally signal integrity values of signals received via the optical receiver 752. The adaptation application 770 then sends requests to the third processor 703 to adjust transmitter parameters of the transmitter of a host device. In an embodiment, the driver 783 monitors signal integrity values received from the adaptation application 770 and determines whether to send a request to the second processor to adjust parameters of the transmitter of the host device. This may include storing transmitter parameter values (or transmitter settings) in the registers 781, which are then transferred via the OOB interface 705 to the host device.

The second processor 702 includes a memory 780 that has registers 781. The third processor 703 includes memory 782 that stores a driver 783. The registers 781 store transmitter parameters to be sent to the host device or transmitter parameters received from the host device. In an embodiment, the host device when adjusting parameters of the transmitter 738, stores transmitter parameters in the registers 781, which are accessed by the second processor 702 and provided to the transmitter 738.

Figure 8:
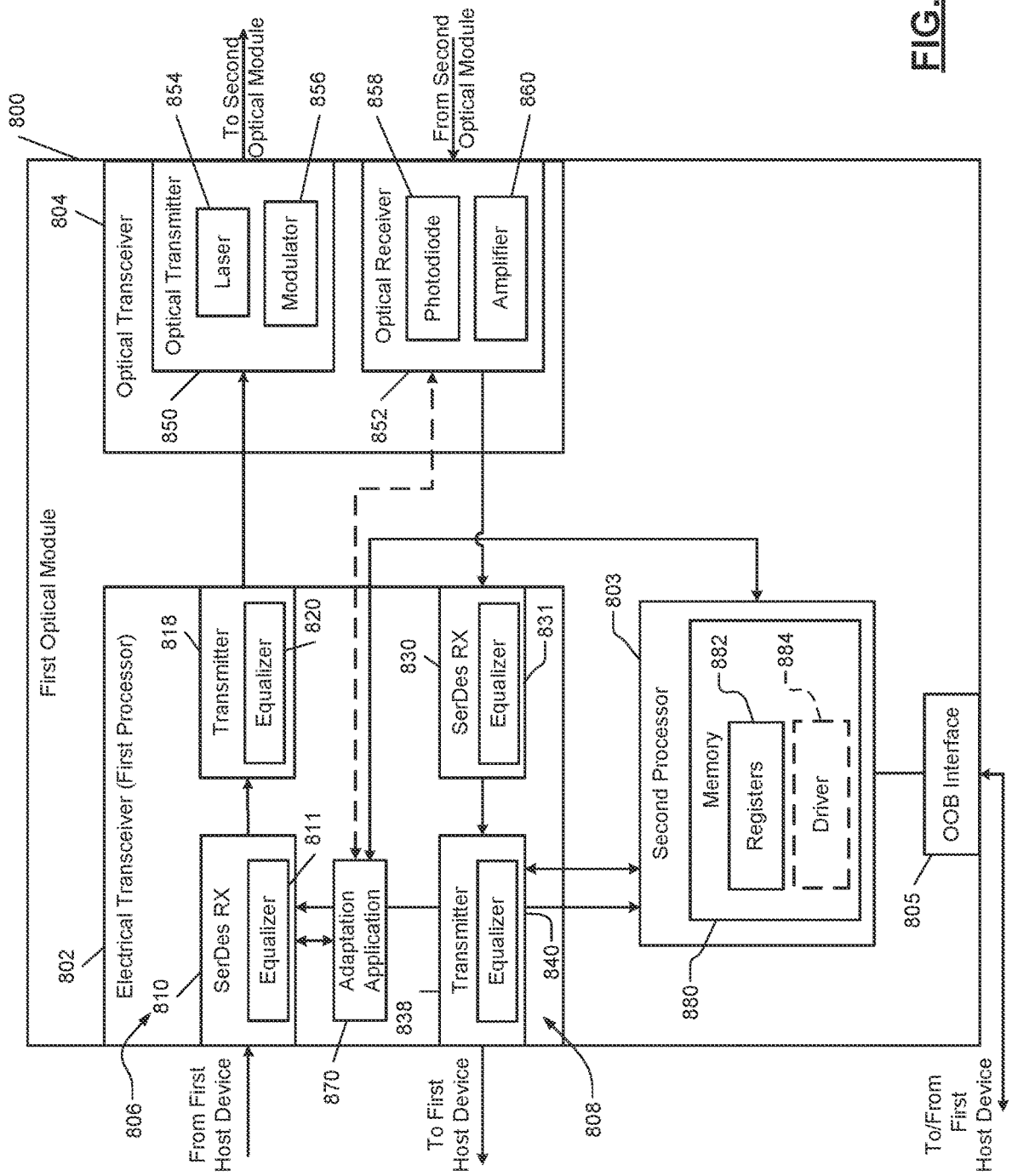
FIG. 8 is a functional block diagram of another example optical module including two processors, one of which including receivers and transmitters in accordance with an embodiment of the present disclosure.

FIG. 8 shows an optical module 800 that may replace any of the optical modules disclosed herein. The optical module 800 includes processors 802, 803, optical transceiver 804, and an OOB interface 805. The processor 802 includes a receive path 806 and a transmit path 808. Although the processor 802 is shown having a signal transmit path and a single receive path, the processor 802 includes any number of transmit and receive paths configured similarly as the shown transmit and receive paths and thus transmits and receives in-band signals to and from any number of host processors. The receive path 806 includes: a SerDes receiver 810 with an equalizer 811; and a transmitter 818 with an equalizer 820. The transmit path 808 includes: a SerDes receiver 830 with an equalizer 831; and a transmitter 838 with an equalizer 840. The optical transceiver 804 includes an optical transmitter 850 and an optical receiver 852. The optical transmitter 850 includes a laser 854 and a modulator 856. The optical receiver 852 includes a photodiode 858 and an amplifier 860.

The first processor (also referred to as an electrical transceiver) 802 further includes an adaptation application 870, which is in communication with the second processor 803 and in an embodiment is in communication with the optical receiver 852. The adaptation application 870 monitors signal integrity values of signals received via the SerDes receiver 810, and optionally signal integrity values of signals received via the optical receiver 852. The adaptation application 870 then sends requests to the second processor 803 to adjust transmitter parameters of the transmitter of the host device.

The second processor 803 includes a memory 880 that has registers 882 and optionally stores a driver 884. In an embodiment, the second processor 803 does not include a driver. In an embodiment, the optical module 800 does not include a driver. The registers 882 store transmitter parameters to be sent to a host device or transmitter parameters received from the host device. In an embodiment, the host device when adjusting parameters of the transmitter 838, stores transmitter parameters in the registers 882, which are accessed by the second processor 803 and provided to the transmitter 838.

Figure 9:
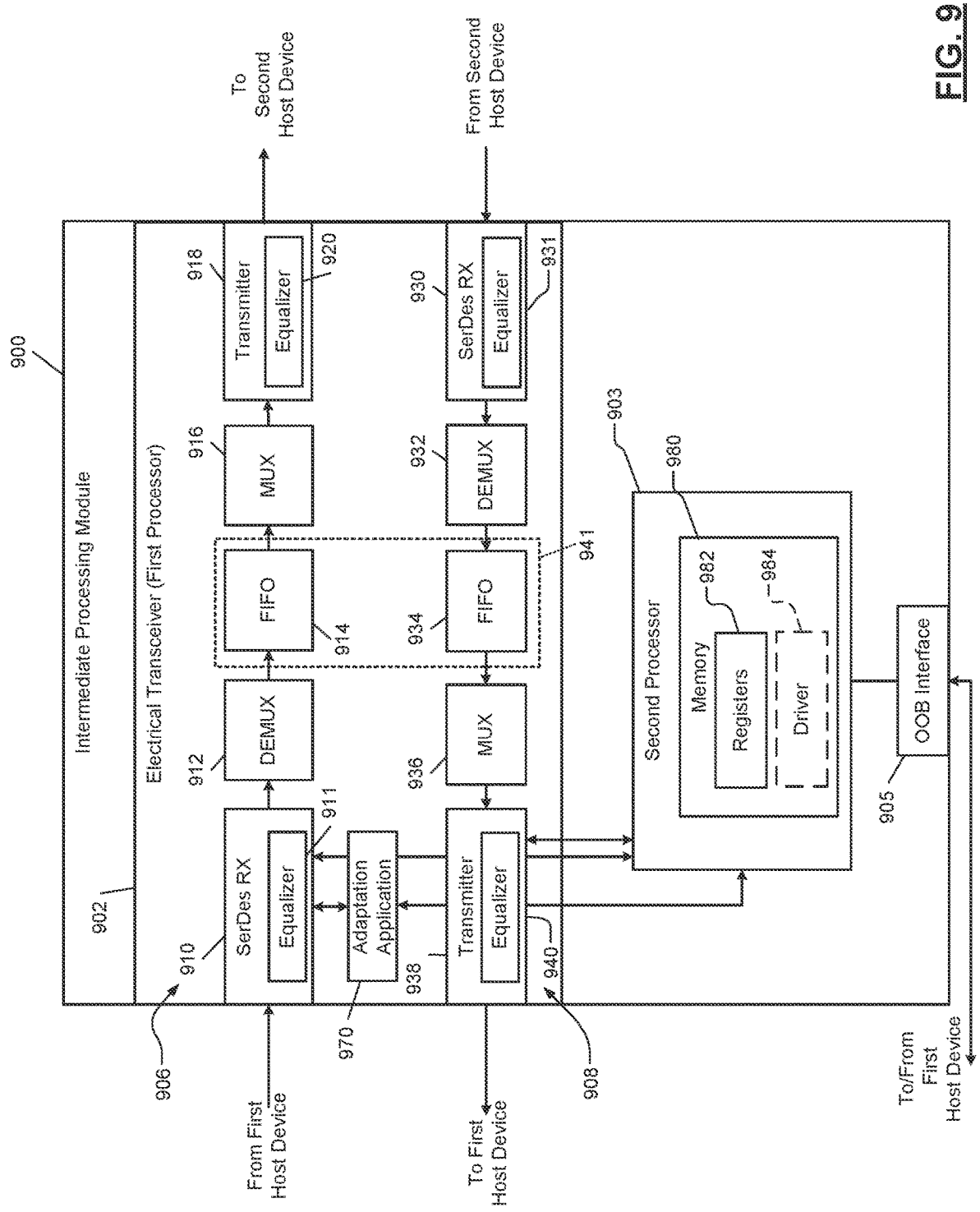
FIG. 9 is a functional block diagram of an example intermediate processing module implemented between two host devices in accordance with another embodiment of the present disclosure.

FIG. 9 shows an intermediate processing module 900 implemented between two host devices. The host devices are similar to other host device disclosed herein, but instead of communicating with respective optical modules via in-band electrical interfaces, communicate with the intermediate processing module 900 via in-band electrical interfaces. The intermediate processing module 900 includes processors 902, 903 and an OOB interface 905. The processor 902 includes a first transmit path 906 and a second transmit path 908. Although the processor 902 is shown having a signal transmit path and a single receive path, the processor 902 includes any number of transmit and receive paths configured similarly as the shown transmit and receive paths and thus transmits and receives in-band signals to and from any number of host processors. The first transmit path 906 includes: a SerDes receiver 910 with an equalizer 911; a demultiplexer 912; a FIFO memory 914; a multiplexer 916; and a transmitter 918 with an equalizer 920. The second transmit path 908 includes: a SerDes receiver 930 with an equalizer 931; a demultiplexer 932; a FIFO memory 934; a multiplexer 936; and a transmitter 938 with an equalizer 940. In an embodiment, the FIFO memories 914, 934 are implemented as a single FIFO memory 941.

The first processor (also referred to as an electrical transceiver) 902 further includes an adaptation application 970, which is in communication with the second processor 903. The adaptation application 970 monitors signal integrity values of signals received via the SerDes receiver 910 and sends requests to the second processor 903 to adjust transmitter parameters of the transmitter of the first host device that is in communication with the SerDes receiver 910. The signal integrity values include SNRs, bit error rates (BERs), etc.

The second processor 903 includes a memory 980 that has registers 982 and optionally stores a driver 984. In an embodiment, the second processor 903 does not include a driver. In an embodiment, the intermediate processing module 900 does not include a driver. The registers 982 store transmitter parameters to be sent to a host device or transmitter parameters received from the host device. In an embodiment, the host device when adjusting parameters of the transmitter 938, stores transmitter parameters in the registers 982, which are accessed by the second processor 903 and provided to the transmitter 938.

The equalizers 510, 512, 611, 620, 631, 640, 711, 720, 731, 740, 811, 820, 831, 840, 911, 920, 931, 940 of FIGS. 5-9 are feedforward equalizers (FFEs), continuous time linear equalizers (CTLEs), or decision feedback equalizers (DFEs) and/or include finite impulse response filters (FIRS), in an embodiment.

The registers 522 of the host device 400 of FIGS. 4-5 allow the processors 602, 701, 802, 902 of the optical modules 600, 700, 800, 900 of FIGS. 6-9 to adjust the parameters of the transmitter 414 of the host device 400. For example, the processors 602, 701, 802, 902 send requests, updated parameters and/or signal integrity ranges via the processors 603, 702, 802, 903 and OOB interfaces 605, 705, 805, 905 to the host device 400, which stores the requests, updated parameters and/or signal integrity ranges in the registers 522. The requests, updated parameters, and/or signal integrity ranges in the registers 522 are then retrieved by the processor 404 and used to set the parameters of the transmitter 414. The requests include increment, decrement, and/or jump requests. Optimized parameter settings are stored and used after a reset and/or power cycling event.

The registers 682, 781, 882, 982 of the optical modules 600, 700, 800, 900 of FIGS. 6-9 allow the first processor 402, the transceiver 410, and/or the second processor 404 of the host device 400 to adjust parameters of the transmitters 638, 738, 838, 938 of the corresponding optical module. For example, the first processor 402, the transceiver 410, and/or the second processor 404 send via the second processor 404 and the OOB interface 412 requests, updated parameters and/or signal integrity ranges to the optical modules 600, 700, 800, 900, which store the requests, updated parameters and/or signal integrity ranges in the registers 682, 781, 882, 982. The requests, updated parameters, and/or signal integrity ranges in the registers 682, 781, 882, 982 are then retrieved by the processors 603, 702, 802, 903 and used to set the parameters of the transmitters 638, 738, 838, 938. The requests include increment, decrement, and/or jump requests. Optimized parameter settings are stored and used after a reset and/or power cycling event.

In an embodiment, the lengths of the registers 522, 682, 781, 882, 982 are the same or greater than cursor (pre and post cursor) lengths. Any number of pre and post cursor coefficients are stored for each equalizer. As an example, an equalizer can have 3 precursors and 1 post cursor. As another example, an equalizer can have 4-6 precursors and 1 post cursor. As another example, an equalizer can have 1-2 precursors and 1-3 post cursors. In an embodiment, the registers 522, 682, 781, 882, 982 are configured to store up to 7 pre cursors and up to 8 post cursors. Any step size can be used to adjust tap coefficients when incrementing and decrementing the tap coefficients. As an example, for the implementation having 3 pre cursors C(−3), C(−2), C(−1) and 1 post cursor C(1), the pre cursor C(−3) has a step size of 0.01, the pre cursor C(−2) has a step size 0.02, the pre cursor C(−1) has a step size 0.025, and the post cursor C(1) has a step size 0.04.

In some embodiments, the OOB signaling performed by the host devices and optical modules disclosed herein includes encoded signaling for reading and writing tap values and/or other transmitter parameters, such as power, wavelength, etc. The encoding is weighted and signed or unsigned, such as S8, U8 or U16 encoding, where 'S' refers to signed and 'U' refers to unsigned. S8 refers to signed eight bit encoding supporting 64 increments, where each increment is 0.01 with a normalized tap weight up to ±0.64. U8 encoding includes 128 increments with an increment size of 0.01 and a normalized tap weight of 1.28. In an embodiment, S8 encoding is used to read content for AUI-S and AUI-L presets including current transmitter parameters of a host device and an optical module transmitter parameters from corresponding registers of the host device and optical module.

In an embodiment, the transceiver 410 of the host device 400 of FIGS. 4-5 makes adjustments to parameters of the transmitter 414 based on feedback from the corresponding optical module to, for example, improve a BER of the corresponding in-band link. The transceiver 410 writes via the second processor 404 and the OOB interface 412 to a register of the optical module a length of the equalizer 510 and cursor values for the transmitter 414 of the host device 400. The optical module indicates to the host device 400 via the corresponding OOB interface (e.g., the OOB interface 605) of FIG. 6 whether residual intersymbol interference (ISI) estimation for current cursors is supported. Based on this indication, the transceiver 410 reads a register indicating the cursors of the transmitter of the host device. The transmitter of the host device then sends an in-band signal to the optical module and the optical module determines signal integrity values for the in-band signal. The host device receives feedback from the optical module and adjusts the cursor values of the transmitter of the host device without reading from the register. This process is iteratively performed until a predetermined criteria is satisfied, a predetermined number of iterations are performed, a timeout period has elapsed, and/or the signal integrity values are no longer improving. The host device than records the resultant parameters for the transmitter of the host device that provided the best signal integrity values for subsequent usage. These parameters are stored as a preset for quick access and efficient setting of the transmitter of the host device.

The following methods of FIGS. 10 and 11 are performed concurrently and/or over overlapping periods of time. Thus, one or more of the operations of FIG. 10 is performed concurrently with one or more operations of FIG. 11. FIG. 10 shows a LT method including operations implemented by the host PCB 300 of FIG. 3. Although the following operations are described with respect to the embodiment of FIG. 3, the operations are applicable to the other embodiments disclosed herein.

At 1000, the first host device 304 determines whether the first host PCB 300 is initialized such that the in-band transmission link 350 can be trained. If yes, operation 1002 is performed. In an embodiment, initialization includes one or more of: the processor 318 determining that the host device 304 and the optical module 308 are powered up including the transceivers 314 and 360; and the processor 318, if not already set, setting the frequency and/or phase of the clock 325, which may be referred to as an initial reference clock.

At 1002, the processors 318, 338 via the transceivers 314, 360, the OOB interfaces 322, 342, and the OOB link 354 train the in-band transmission link 350. This includes transmitting one or more LT signals from the first host device 304 to the first optical module 308 via the in-band transmission link 350, and one or more OOB signals between the OOB interfaces 322, 342. In an embodiment, the LT includes i) the first host device 304 transmitting requests via the OOB link 354 to the first optical module 308 to adjust settings of the transceiver 360, and/or ii) the first optical module 308 transmitting requests to the first host device 304 via the OOB link 354 to adjust settings of the transceiver 314. The settings include transmitter and receiver settings such as any of the settings referred to herein. In an embodiment, the in-band reception link 351 is down while operation 1002 is performed. In an embodiment, the LT signals transmitted on the in-band transmission link 350 are non-return to zero (NRZ) signals having an embedded clock signal. The CDR 368 performs clock data recovery and synchronizes the clock 364 of the transceiver 360 to match a frequency of the embedded clock signal. The CFC 372 forwards the clock signal to the transceiver 334 to synchronize the clock 358. The training of the in-band transmission link 350 includes synchronizing the clock 325 of the host device to one or more clocks (e.g., clocks 364, 358) of the optical module 308. In an embodiment, at completion of operation 1002, the clocks 325, 364 are synchronized. In another embodiment and at completion of operation 1002, the clocks 325, 358, 364 are synchronized.

At 1004, the processor 338 determines whether LT of the in-band transmission link 350 is completed. If yes, operation 1006 is performed, otherwise operation 1002 is continued.

At 1006, the clock 358 of the optical transceiver 334 is synchronized to the clock 364 of the electrical transceiver 360. In an embodiment, operation 1006 is not performed when the clock 358 is already synchronized or when the optical module 308 does not include the clock 358.

At 1008, the optical transceiver 334 transmits an awake signal, which in an embodiment is an IDLE signal, via the first optical link 356 to the optical transceiver 336. In an embodiment, the processor 338 and/or the DSP chip 330 instructs the optical transceiver 334 to generate the awake signal and/or the optical transceiver 334 transmits the awake signal in response to the clock 358 being synchronized. The transmission of the awake signal is done to indicate to the second host PCB 302 that the first host PCB 300 is up and waiting to train in-band reception links (e.g., links 351, 352). The transmission of the awake signal is also done to maintain the first optical module 308 in an active and waiting state until the second optical module 310 responds. This prevents the first optical module 308 from timing out and restarting, which aids in preventing a race condition.

At 1010, the processor 338 and/or the DSP chip 330 determines whether i) another awake signal is received from the second optical module 310, and/or ii) a response to the awake signal generated by the first optical module 308 has been received from the second optical module 310. If yes, operation 1012 is performed, otherwise operation 1008 is performed.

At 1012, the processors 318, 338 via the transceivers 314, 360, the OOB interfaces 322, 342, and the OOB link 354 train the in-band reception link 351. This includes transmitting one or more LT signals from the first optical module 308 to first host device 304 via the in-band reception link 351, and one or more OOB signals between the OOB interfaces 322, 342. In an embodiment, the LT includes i) the first host device 304 transmitting requests via the OOB link 354 to the first optical module 308 to adjust settings of the transceiver 360, and/or ii) the first optical module 308 transmitting requests to the first host device 304 via the OOB link 354 to adjust settings of the transceiver 314. The settings include any of the settings referred to herein. In an embodiment, the training of the in-band reception link 351 is done independent of and/or without transmitting signals on the in-band transmission link 350.

In the above-described method, transmission of the LT training signals on the in-band transmission link 350 enables i) the optical link 356 and signals thereon to have the same clock frequency as the LT signals, and the LT signals transmitted on the in-band reception link 352 to have the same clock frequency as the optical link 356 and signals transmitted thereon. The links 350, 356, 352 refer to a first signal path between the host devices 304, 306. Similarly, transmission of the LT training signals on the in-band transmission link 353 enables i) the optical link 357 and signals thereon to have the same frequency as the LT signals, and the LT signals transmitted on the in-band reception link 351 to have the same clock frequency as the optical link 357 and signals transmitted thereon. The links 351, 357, 353 refer to a second signal path between the host devices 304, 306. In an embodiment, the clock frequency of the second signal path is the same clock frequency as the first signal path. In another embodiment, the clock frequency of the second signal path is at a same nominal frequency (e.g., frequency of the first signal path differs slightly by up to ±100 parts-per-million (ppm)) as the first signal path). In clock forwarding mode, link 356 is not up until link 350 is up. Link 352 is not up until link 356 is up. Similarly, link 357 is not up until link 353 is up. Link 351 is not up until link 357 is up.

In an embodiment, a first reference clock signal is transmitted to the second optical module 310 subsequent to the in-band transmission link 350 being trained. The first reference clock signal is forwarded to the transceivers 366 and 316. The first optical module 308 then waits for a second reference clock signal from the second optical module 310. The first optical module 308 begins training the in-band reception link 351 subsequent to receiving the second reference clock signal.

FIG. 11 shows a LT method including operations implemented by the host PCB 302 of FIG. 3.

At 1100, the second host device 306 determines whether the second host PCB 302 is initialized such that the in-band transmission link 353 can be trained. If yes, operation 1102 is performed. In an embodiment, initialization includes one or more of: the processor 320 determining that the host device 306 and the optical module 310 are powered up including the transceivers 316 and 362; and the processor 320, if not already set, setting the frequency and/or phase of the clock 326, which may be referred to as an initial reference clock.

At 1102, the processors 320, 340 via the transceivers 316, 362, the OOB interfaces 324, 344, and the OOB link 355 train the in-band transmission link 353. This includes transmitting one or more LT signals from the second host device 306 to the second optical module 310 via the in-band transmission link 353, and one or more OOB signals between the OOB interfaces 324, 344. In an embodiment, the LT includes i) the second host device 306 transmitting requests via the OOB link 355 to the second optical module 310 to adjust settings of the transceiver 362, and/or ii) the second optical module 310 transmitting requests to the second host device 306 via the OOB link 355 to adjust settings of the transceiver 316. The settings include transmitter and receiver settings such as any of the settings referred to herein. In an embodiment, the in-band reception link 352 is down while operation 1102 is performed. In an embodiment, the LT signals transmitted on the in-band transmission link 353 are non-return to zero (NRZ) signals having an embedded clock signal. The CDR 370 performs clock data recovery and synchronizes the clock 366 of the transceiver 362 to match a frequency of the embedded clock signal. The CFC 374 forwards the clock signal to the transceiver 336 to synchronize the clock 359. The training of the in-band transmission link 353 includes synchronizing the clock 326 of the host device 306 to one or more clocks (e.g., clocks 366, 359) of the optical module 310. In an embodiment, at completion of operation 1102, the clocks 326, 366 are synchronized. In another embodiment and at completion of operation 1102, the clocks 326, 359, 366 are synchronized.

At 1104, the processor 340 determines whether LT of the in-band transmission link 353 is completed. If yes, operation 1106 is performed, otherwise operation 1102 is continued.

At 1106, the clock 359 of the optical transceiver 336 is synchronized to the clock 366 of the electrical transceiver 362. In an embodiment, operation 1106 is not performed when the clock 359 is already synchronized or when the optical module 310 does not include the clock 359.

At 1108, the optical transceiver 336 transmits an awake signal, which in an embodiment is an IDLE signal, via the second optical link 357 to the optical transceiver 334. In an embodiment, the processor 340 and/or the DSP chip 332 instructs the optical transceiver 336 to generate the awake signal and/or the optical transceiver 336 transmits the awake signal in response to the clock 359 being synchronized. The transmission of the awake signal is done to indicate to the first host PCB 300 that the second host PCB 302 is up and waiting to train in-band reception links (e.g., links 351, 352). The transmission of the awake signal is also done to maintain the second optical module 310 in an active and waiting state until the first optical module 308 responds. This prevents the second optical module 310 from timing out and restarting, which aids in preventing a race condition.

At 1110, the processor 340 and/or the DSP chip 332 determines whether i) another awake signal is received from the first optical module 308, and/or ii) a response to the awake signal generated by the second optical module 310 has been received from the first optical module 308. If yes, operation 1112 is performed, otherwise operation 1108 is performed.

At 1112, the processors 320, 340 via the transceivers 316, 362, the OOB interfaces 324, 344, and the OOB link 355 train the in-band reception link 352. This includes transmitting one or more LT signals from the second optical module 310 to second host device 306 via the in-band reception link 352, and one or more OOB signals between the OOB interfaces 324, 344. In an embodiment, the LT includes i) the second host device 306 transmitting requests via the OOB link 355 to the second optical module 310 to adjust settings of the transceiver 362, and/or ii) the second optical module 310 transmitting requests to the second host device 306 via the OOB link 355 to adjust settings of the transceiver 316. The settings include any of the settings referred to herein. In an embodiment, the training of the in-band reception link 352 is done independent of and/or without transmitting signals on the in-band transmission link 353.

In an embodiment, a first reference clock signal is transmitted to the first optical module 308 subsequent to the in-band transmission link 353 being trained. The first reference clock signal is forwarded to the transceivers 360 and 314. The second optical module 310 then waits for a second reference clock signal from the first optical module 308. The second optical module 310 begins training the in-band reception link 352 subsequent to receiving the second reference clock signal.

The above-described examples include providing LT requests, such as update requests, via OOB links, which decouples in-band transmission and reception link pairs of host PCBs. Each direction (host device to optical module and optical module to host device) is handled by an independent process. Restarts in a host device-to-optical module direction do not cause restarts in an optical module to host device direction and vice versa.

Upon a plug-in event (i.e., a host PCB is turned ON and initialized), the disclosed examples include starting LT in host device-to-optical module directions, not in optical module-to-host device directions. In an embodiment, after LT in the host device-to-optical module direction is completed, then LT in the optical module-to-host device direction is implemented. After the host device-to-optical module LT of a host PCB is completed, the optical module of the host PCB begins and continues to transmit IDLE signals until receiving a response to one of the IDLE signals. This maintains the host PCB in an up, active and wait state. The IDLE signals are propagated over an optical link of an optical cable to an opposite side optical module of another host PCB. Optical modules at each end of the optical cable performs this function and keeps its egress path up despite the corresponding ingress path being down. Each of the optical modules wait for a corresponding LRX to come up, which eventually happens after the host device-to-optical module LT is performed at each host PCB. When a LRX for an optical module is up, a stable LRX clock signal is received at that optical module and is forwarded to the corresponding HTX of that optical module. At this point, the optical module is ready to perform optical module-to-host device (TxMod to RxHost) training of a corresponding in-band reception link. This occurs at each of optical module of the host PCBs.

The above-described examples assure that i) links from a first host device to a second host device including electrical and optical links are operating at a same frequency, and ii) links from the second host device to the first host device including electrical and optical links are operating at a same frequency. This assures that there is not timing issues with transmission and reception of data between the host devices. Timing issues can cause data to be delayed and/or lost.

It is noted that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure. Also, as used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A first optical module comprising:
an optical transceiver configured i) subsequent to completion of link training of an in-band transmission link between the first optical module and a host device, to wait for a second optical module to come up including transmitting a first awake signal from the first optical module to the second optical module, the second optical module is up when powered ON and is in a state to transmit a second awake signal to the first optical module, and ii) to receive the second awake signal from the second optical module when the second optical module is up; and
a digital signal processing chip configured i) based on a first out-of-band signal transmitted via an out-of-band link between the first optical module and the host device, to perform the link training of the in-band transmission link independently of an in-band reception link between the first optical module and the host device, and ii) based on the second awake signal and a second out-of-band signal transmitted via the out-of-band link, to perform link training of the in-band reception link between the first optical module and the host device independent of the in-band transmission link, the first out-of-band signal and the second out-of-band signal being control signals for testing the in-band transmission link and the in-band reception link.

2. The first optical module of claim 1, wherein the optical transceiver is configured, subsequent to completing link training of the in-band transmission link, to continue to transmit IDLE signals to the second optical module until receiving the second awake signal.

3. The first optical module of claim 1, wherein the digital signal processing chip is configured to i) receive a LT signal from the host device during link training of the in-band transmission link, and ii) based on a clock signal embedded in the LT signal, synchronize a clock of the first optical module with the clock signal embedded in the LT signal.

4. The first optical module of claim 3, further comprising a processor configured, during link training of the in-band transmission link, to transmit the first out-of-band signal to the host device to adjust parameters of a transceiver of the host device,
wherein the digital signal processing chip is configured to receive the LT signal based on the adjusted parameters of the transceiver of the host device.

5. The first optical module of claim 1, wherein the digital signal processing chip comprises a transceiver, and is configured to receive the first out-of-band signal from the host device, and to adjust parameters of the transceiver based on the first out-of-band signal.

6. The first optical module of claim 5, wherein the digital signal processing chip is configured to receive an LT signal from the host device subsequent to adjusting the parameters of the transceiver.

7. The first optical module of claim 1, wherein the digital signal processing chip comprises a transceiver and is configured to transmit a LT signal to the host device during link training of the in-band reception link, and based on the LT signal, receive the second out-of-band signal from the host device to adjust parameters of the transceiver.

8. The first optical module of claim 1, wherein the digital signal processing chip comprises a transceiver and is configured to receive the second out-of-band signal from the host device to adjust parameters of the transceiver, adjust the parameters, and transmit a LT signal to the host device to train the in-band reception link.

9. The first optical module of claim 1, wherein the digital signal processing chip is configured to transmit the second out-of-band signal to the host device to adjust parameters of a transceiver of the host device, and subsequent to adjusting the parameters of the transceiver of the host device, transmit a LT signal to the host device to train the in-band reception link.

10. The first optical module of claim 1, wherein the optical transceiver is configured i) to receive the second awake signal in response to the first awake signal, or ii) to receive the second awake signal independent of the first awake signal.

11. The first optical module of claim 1, wherein the optical transceiver is configured i) subsequent to completion of link training of the in-band transmission link between the first optical module and the host device, to wait for the second optical module to come up including transmitting the first awake signal from the first optical module to the second optical module via a first optical link, and ii) receive the second awake signal from the second optical module via a second optical link when the second optical module is up.

12. The first optical module of claim 1, wherein the optical transceiver is configured:
subsequent to independently training the in-band transmission link, to forward a first reference clock signal to the second optical module;
to wait for a second reference clock signal from the second optical module; and
to begin training the in-band reception link subsequent to receiving the second reference clock signal.

13. A link training method comprising:
based on a first out-of-band signal transmitted via an out-of-band link between a first optical module and a host device, performing link training of an in-band transmission link between the first optical module and the host device independently of an in-band reception link between the first optical module and the host device, the first out-of-band signal being a control signal for testing the in-band transmission link;
subsequent to completion of the link training of the in-band transmission link between the first optical module and the host device, waiting at the first optical module for a second optical module to come up including transmitting a first awake signal from the first optical module to the second optical module, the second optical module is up when powered ON and is in a state to transmit a second awake signal to the first optical module;
receiving, at an optical transceiver of the first optical module, the second awake signal from the second optical module when the second optical module is up; and
based on the second awake signal and a second out-of-band signal transmitted via the out-of-band link, performing link training of the in-band reception link independently of the in-band transmission link, the second out-of-band signal being a control signal for testing the in-band reception link.

14. The method of claim 13, further comprising, subsequent to completing link training of the in-band transmission link, transmitting IDLE signals from the optical transceiver of the first optical module to the second optical module until receiving the second awake signal at the first optical module.

15. The method of claim 13, further comprising:
receiving a LT signal from the host device during link training of the in-band transmission link at the first optical module; and based on a clock signal embedded in the LT signal, synchronizing a clock of the first optical module with the clock signal embedded in the LT signal.

16. The method of claim 15, further comprising:
during link training of the in-band transmission link, transmitting the first out-of-band signal from the first optical module to the host device to adjust parameters of a transceiver of the host device; and
receiving at the first optical module the LT signal based on the adjusted parameters of the transceiver of the host device.

17. The method of claim 13, further comprising:
receiving the first out-of-band signal from the host device at the first optical module; and
adjusting parameters of a transceiver of the first optical module based on the first out-of-band signal.

18. The method of claim 17, further comprising receiving an LT signal from the host device at the first optical module subsequent to adjusting the parameters of the transceiver.

19. The method of claim 13, further comprising:
transmitting a LT signal from the first optical module to the host device during link training of the in-band reception link; and
based on the LT signal, receiving the second out-of-band signal from the host device at a transceiver of the first optical module to adjust parameters of the transceiver.

20. The method of claim 13, further comprising:
receiving the second out-of-band signal from the host device at the first optical module to adjust parameters of a transceiver of the first optical module;
adjusting the parameters; and
transmitting a LT signal from the first optical module to the host device to train the in-band reception link.

21. The method of claim 13, further comprising:
transmitting the second out-of-band signal from the first optical module to the host device to adjust parameters of a transceiver of the host device; and
subsequent to adjusting the parameters of the transceiver of the host device, transmitting a LT signal from the first optical module to the host device to train the in-band reception link.

22. The method of claim 13, further comprising, via the optical transceiver, receiving the second awake signal in response to the first awake signal, or receiving the second awake signal independent of the first awake signal.

23. The method of claim 13, further comprising:
via the optical transceiver and subsequent to completion of link training of the in-band transmission link between the first optical module and the host device, waiting for the second optical module to come up including transmitting the first awake signal from the first optical module to the second optical module via a first optical link; and
receiving at the optical transceiver the second awake signal from the second optical module via a second optical link when the second optical module is up.

* * * * *